United States Patent
Cho et al.

(10) Patent No.: US 10,362,433 B2
(45) Date of Patent: Jul. 23, 2019

(54) ELECTRONIC DEVICE AND CONTROL METHOD THEREOF

(71) Applicant: SAMSUNG ELECTRONICS CO., LTD., Suwon-si (KR)

(72) Inventors: Jae-youn Cho, Suwon-si (KR); Sun-min Kim, Yongin-si (KR); Ki-beom Kim, Yongin-si (KR); Ki-woong Kang, Suwon-si (KR); Dong-hyun Lim, Seoul (KR); In-woo Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/708,396

(22) Filed: Sep. 19, 2017

(65) Prior Publication Data
US 2018/0091926 A1  Mar. 29, 2018

(30) Foreign Application Priority Data

Sep. 23, 2016  (KR) ........................ 10-2016-0122050

(51) Int. Cl.
*H04S 7/00*  (2006.01)
*G10L 25/51*  (2013.01)
(Continued)

(52) U.S. Cl.
CPC ............ *H04S 7/307* (2013.01); *G06F 3/0482* (2013.01); *G06F 3/165* (2013.01); *G10L 25/51* (2013.01);
(Continued)

(58) Field of Classification Search
CPC .......... H04S 7/307; G10L 25/51; G10L 25/78
See application file for complete search history.

(56) References Cited

U.S. PATENT DOCUMENTS 5,197,100 A  *  3/1993  Shiraki .................... H04N 5/60
                                                        348/738
5,298,674 A     3/1994  Yun
(Continued)

FOREIGN PATENT DOCUMENTS

EP     2 840 571 A2     2/2015
EP     3 197 182 A1     7/2017
(Continued)

OTHER PUBLICATIONS

Communication issued by the International Searching Authority dated Dec. 27, 2017 in counterpart International Patent Application No. PCT/KR2017/009942 (PCT/ISA/210).
(Continued)

*Primary Examiner* — David L Ton
(74) *Attorney, Agent, or Firm* — Sughrue Mion, PLLC

(57) ABSTRACT

An electronic device providing a smart sound mode is provided. The electronic device includes: a user command receiver; an inputter; an outputter; and a processor configured to: in response to a predetermined event occurring, provide a user interface (UI) for guiding setting of a smart sound mode; in response to the smart sound mode being selected according to a user command input through the user command receiver, individually render a first sound signal which is a common component among a plurality of channels forming the sound signal and a second sound signal which is a differential component among the plurality of channels based on whether the first sound signal comprises a voice and whether the second sound signal comprise a sound effect, mix the first and second sound signals which are rendered into a multi-channel sound signal and control the outputter to output the multi-channel sound signal.

18 Claims, 17 Drawing Sheets

(51) Int. Cl.
  *G10L 25/78* (2013.01)
  *G06F 3/0482* (2013.01)
  *H04R 5/02* (2006.01)
  *H04S 3/00* (2006.01)
  *G06F 3/16* (2006.01)
  *H04N 21/439* (2011.01)
  *H04N 5/60* (2006.01)
  *H04N 21/485* (2011.01)
  *H04S 5/00* (2006.01)

(52) U.S. Cl.
  CPC ......... *G10L 25/78* (2013.01); *H04N 21/4394* (2013.01); *H04R 5/02* (2013.01); *H04S 3/008* (2013.01); *H04N 5/60* (2013.01); *H04N 21/4398* (2013.01); *H04N 21/4852* (2013.01); *H04R 2499/15* (2013.01); *H04S 5/00* (2013.01); *H04S 2400/01* (2013.01); *H04S 2400/03* (2013.01); *H04S 2400/05* (2013.01); *H04S 2420/01* (2013.01); *H04S 2420/07* (2013.01)

(56) References Cited

U.S. PATENT DOCUMENTS

| | | |
|---|---|---|
| 7,412,380 B1 | 8/2008 | Avendano et al. |
| 8,509,092 B2 | 8/2013 | Shimada et al. |
| 8,891,797 B2 | 11/2014 | Thiergart et al. |
| 9,536,529 B2 | 1/2017 | Oh |
| 2001/0012370 A1 | 8/2001 | Klayman et al. |
| 2005/0232445 A1 | 10/2005 | Vaudrey et al. |
| 2011/0071837 A1 | 3/2011 | Yonekubo et al. |
| 2015/0256891 A1 | 9/2015 | Kim et al. |
| 2017/0251323 A1 | 8/2017 | Jo et al. |

FOREIGN PATENT DOCUMENTS

| | | |
|---|---|---|
| JP | 5773124 B2 | 9/2015 |
| KR | 101405976 B1 | 6/2014 |
| KR | 101537653 B1 | 7/2015 |
| KR | 1020150104347 A | 9/2015 |
| KR | 1020160020377 A | 2/2016 |
| WO | 2016/019130 A1 | 2/2016 |
| WO | 2016/024847 A1 | 2/2016 |

OTHER PUBLICATIONS

Communication issued by the International Searching Authority dated Dec. 27, 2017 in counterpart International Patent Application No. PCT/KR2017/009942 (PCT/ISA/237).

Communication issued by the European Patent Office dated Feb. 12, 2018 in counterpart European Patent Application No. 17191341.1.

Bian Wu et al., "A Novel Speech/Noise Discrimination Method for Embedded ASR System", EURASIP Journal on Applied Signal Processing, Dec. 1, 2004, pp. 1721-1726, vol. 2004, No. 11, XP055443795, DOI: 10.1155/S111086570440225X.

Communication dated Feb. 13, 2019, issued by the European Patent Office in counterpart European Application No. 17191341.1.

\* cited by examiner

ELECTRONIC DEVICE AND CONTROL METHOD THEREOF

CROSS-REFERENCE TO RELATED APPLICATIONS

This application claims priority from Korean Patent Application No. 10-2016-0122050, filed on Sep. 23, 2016, in the Korean Intellectual Property Office, the disclosure of which is incorporated herein by reference in its entirety.

BACKGROUND

Field

Apparatuses and methods consistent with exemplary embodiments relate to an electronic device and a control method thereof, and more particularly, to an electronic device provided with a plurality of speakers and a control method thereof.

Description of the Related Art

With the enhancement of electronic technology, various types of electronic devices have been developed and distributed. In particular, sound output devices which are used in various places such as houses, offices, public places, or the like, such as speakers, have been continuously developed in recent years.

As performance of the sound output devices has been enhanced, signals to be inputted to audios have a multi-channel form to enhance sound quality and form a wide sound stage.

In electronic devices such as televisions (TVs), a desired sound mode may be selected. For example, a user may select various sound modes such as a movie mode, a news mode, a music mode, a game mode, or the like according to a type of a content that the user wishes to view, and may be provided with the selected sound mode.

In this case, the user should directly select a sound mode, which may cause inconvenience. In addition, most of the users view contents without setting a sound mode and thus there is a problem that users do not enjoy proper sound effects.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an electronic device which divides a sound signal of a content into a center signal and an ambient signal, and renders the signals according to respective signal characteristics such that it can provide a sound optimized to the content, and a control method thereof.

One or more exemplary embodiments also provide an electronic device which can provide a sound optimized to a context of a content by rendering based on real-time content analysis, and a control method thereof.

According to an aspect of an exemplary embodiment, there is provided an electronic device providing a smart sound mode including: a user command receiver; an inputter; and an outputter and a processor configured to individually render, in response to the smart sound mode being selected according to a user command input through the user command receiver, a first sound signal and a second sound signal based on whether the first sound signal comprise a voice and whether the second sound signal comprise a sound effect, wherein the first sound signal is a common component among a plurality of channels forming the sound signal and the second sound signal is a differential component among the plurality of channels; mix the rendered first and second sound signals into a multi-channel sound signal; and control the outputter to output the multi-channel sound signal.

In addition, the processor may be configured to: identify a frequency variation in the first sound signal in the unit of a predetermined section, and render the first sound signal based on whether a voice exists in each section; and identify a frequency variation in the second sound signal in the unit of a predetermined section, and render the second sound signal based on whether a sound effect exists in each section.

In addition, the processor may be configured to: if a number of frequencies having a size variation greater than or equal to a first threshold is greater than or equal to a first threshold number in each section of the first sound signal, identifying that the voice exists in a corresponding section; and, if a number of frequencies having a size variation greater than or equal to a second threshold is greater than or equal to a second threshold number in each section of the second sound signal, identify that the sound effect exists in a corresponding section.

In addition, the processor may be configured to: render the first sound signal by applying a weight value to a voice highlighting filter in a predetermined rendering unit section based on whether each section of the first sound signal comprises a voice; and render the second sound signal by applying a weight value to a sound effect highlighting filter in a predetermined rendering unit section based on whether each section of the second sound signal comprises a background sound.

In addition, the processor may be configured to: render the first sound signal by updating a parameter applied in each of the predetermined rendering unit sections based on whether each section of the first sound signal comprises a voice; and render the second sound signal by updating a parameter applied in each of the predetermined rendering unit sections based on whether each section of the second sound signal comprises a sound effect.

In addition, the processor may be configured to adjust a weight value of a filter applied to at least one of the first sound signal and the second sound signal based on at least one of device setting information of the electronic device, viewing environment information, use history information, and additional information related to the sound content.

In addition, in response to it being determined that a musical element exists in at least one of the first sound signal and the second sound signal, the processor may be configured to render the second sound signal by applying a predetermined weight value to a music highlighting filter.

In addition, the sound signal may be a two-channel stereo signal, and the processor may be configured to divide the two-channel stereo signal into a center signal which is a common component in the two-channel stereo signal and an ambient signal which is a differential component in the two-channel stereo signal, and individually render the center signal and the ambient signal based on whether the center signal comprises a voice and whether the ambient signal comprises a sound effect.

In addition, the electronic device may further include a display, and, in response to the predetermined event occurring, the processor may be configured to provide at least one of a UI for enabling entry to the smart sound mode and a UI for adjusting a smart sound effect through the display.

Herein, the predetermined event may include at least one of an event of pressing a predetermined button provided on a remote control device controlling the electronic device, and an event of outputting a sound portion appropriate to apply the smart sound mode.

According to an aspect of another exemplary embodiment, there is provided a control method of an electronic device providing a smart sound mode, the control method including: receiving a sound signal; providing, in response to a predetermined event occurring, a UI for guiding setting of a smart sound mode; individually render, in response to the smart sound mode being selected according to a user command, a first sound signal and a second sound signal based on whether the first sound signal comprises a voice and whether the second sound signal comprise a sound effect, wherein the first sound signal which is a common component among a plurality of channels forming the received sound signal and the second sound signal is a differential component among the plurality of channels; and mixing the rendered first and second sound signals into a multi-channel sound signal, and outputting the multi-channel sound signal.

In addition, the rendering may include: identifying a frequency variation in the first sound signal in the unit of a predetermined section, and rendering the first sound signal based on whether a voice exists in each section; and identifying a frequency variation in the second sound signal in the unit of a predetermined section, and rendering the second sound signal based on whether a sound effect exists in each section.

In addition, the rendering may include: if a number of frequencies having a size variation greater than or equal to a first threshold is greater than or equal to a first threshold number in each section of the first sound signal, identifying that the voice exists in a corresponding section; and, if a number of frequencies having a size variation greater than or equal to a second threshold is greater than or equal to a second threshold number in each section of the second sound signal, identifying that the sound effect exists in a corresponding section.

In addition, the rendering may include: rendering the first sound signal by applying a weight value to a voice highlighting filter in a predetermined rendering unit section based on whether each section of the first sound signal comprises a voice; and rendering the second sound signal by applying a weight value to a sound effect highlighting filter in a predetermined rendering unit section based on whether each section of the second sound signal comprises a background sound.

In addition, the rendering may include: rendering the first sound signal by updating a parameter applied in each of the predetermined rendering unit sections based on whether each section of the first sound signal comprises a voice; and rendering the second sound signal by updating a parameter applied in each of the predetermined rendering unit sections based on whether each section of the second sound signal comprises a sound effect.

In addition, the rendering may include adjusting a weight value of a filter applied to at least one of the first sound signal and the second sound signal based on at least one of device setting information of the electronic device, viewing environment information, use history information, and additional information related to the sound content.

The control method may further include, in response to it being determined that a musical element exists in at least one of the first sound signal and the second sound signal, rendering the second sound signal by applying a predetermined weight value to a music highlighting filter.

The sound signal may be a two-channel stereo signal, and the dividing may include dividing the two-channel stereo signal into a center signal which is a common component in the two-channel stereo signal and an ambient signal which is a differential component in the two-channel stereo signal, and the rendering may include individually rendering the center signal and the ambient signal based on whether the center signal comprises a voice and whether the ambient signal comprises a sound effect.

In addition, the control method may further include, in response to the predetermined event occurring, providing at least one of a UI for enabling entry to the smart sound mode and a UI for adjusting the smart sound effect.

Herein, the predetermined event may include at least one of an event of pressing a predetermined button provided on a remote control device controlling the electronic device, and an event of outputting a sound portion appropriate to apply the smart sound mode.

According to yet another aspect of an exemplary embodiment, there is provided an electronic device providing a smart sound mode which comprises a user command receiver configured to receive a user command; an inputter configured to receive a sound signal; a processor configured to: divide the received signal into a first sound signal which is a common component in the received signal and a second sound signal which is a differential component in the received signal, in response to the received signal being divided into the first sound signal and the second sound signal, identifying whether a voice exists in the first sound signal and whether a sound effect exists in the second signal by identifying a frequency variation in a unit of a predetermined period in each of the first and second sound signals, individually render the first sound signal and the second sound signal based on the result of identification of the voice in the first sound signal and the sound effect in the second sound signal, and mix the rendered first sound signal and the rendered second sound signal into a multi-channel sound signal; and an outputter configured to the multi-channel sound signal.

The processor may be configured to display at least one of a UI for enabling entry to a smart sound mode and a UI for adjusting a smart sound effect on a display in response to a predetermined event occurring.

The processor may be configured to: detect that the voice exists in a section of the first sound signal if a number of frequencies having a size variation greater than or equal to a first threshold is greater than or equal to a first threshold number in the section of the first sound signal; and detect that the sound effect exists in a section of the second sound signal if a number of frequencies having a size variation greater than or equal to a second threshold is greater than or equal to a second threshold number in the section of the second sound signal.

According to various embodiments, a sound signal of a content is divided into a center signal and an ambient signal and the divided signals are rendered based on their respective signal characteristics, such that a voice can be provided more clearly and a wider sound field can be provided regarding a sound effect.

In addition, real-time rendering is performed by analyzing a content in a predetermined sound section unit, such that a smarter sound effect can be provided.

In addition, a sound of a content is rendered based on a variety of additional information such that sound rendering optimized to a user context is performed and thus a smarter sound effect can be provided.

Additional and/or other aspects and advantages of the present disclosure will be set forth in part in the description which follows and, in part, will be obvious from the description, or may be learned by practice of the present disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EXEMPLARY EMBODIMENTS

Hereinafter, various embodiments will be described in detail with reference to the accompanying drawings.

Figure 1:
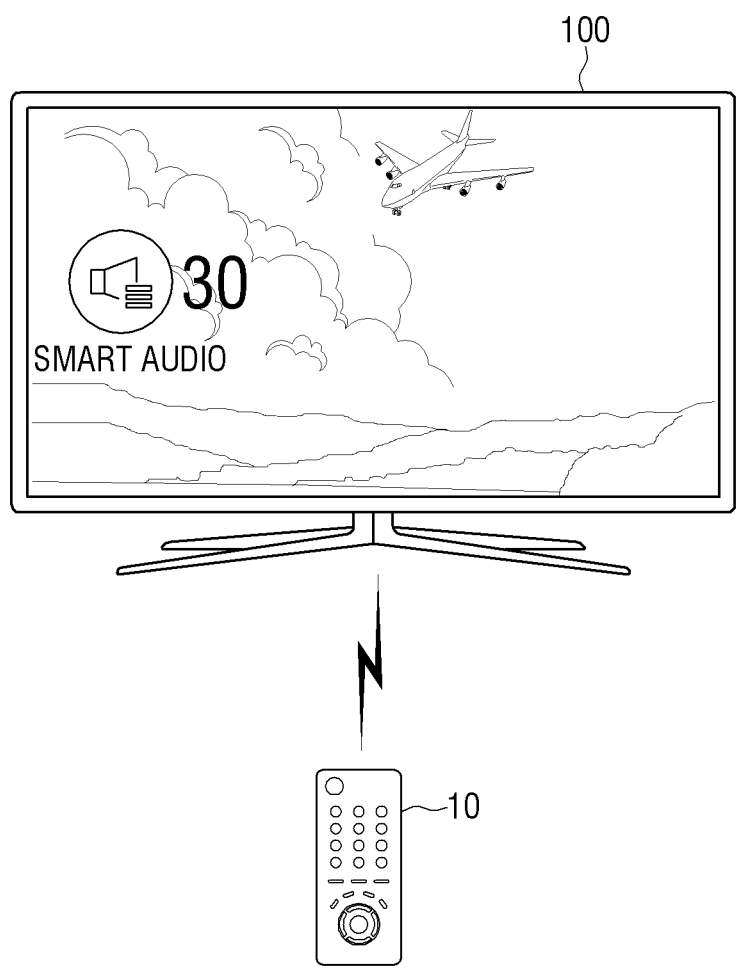
FIG. 1 is a view showing one implementation example of an electronic device according to an exemplary embodiment.

FIG. 1 is a view showing an implementation example of an electronic device according to an exemplary embodiment.

Referring to FIG. 1, the electronic device 100 may be implemented by using a digital TV provided with a plurality of speaker units. However, this should not be considered as limiting. Any device provided with a plurality of speaker units such as an audio device, a user terminal device, a sound bar, a home theater system, a room speaker, or the like, can be applied without a limitation thereto.

When the electronic device 100 is implemented by using the digital TV, the electronic device 100 may be controlled by a remote control device 10 or a user motion or voice. For example, the remote control device 10 may be implemented in various forms such as transmitting a signal corresponding to an inputted key, detecting a motion and transmitting a signal corresponding to the motion, or recognizing a voice and transmitting a signal corresponding to the recognized voice. In this case, the remote control device 10 may be implemented to include at least one of a motion sensor, a touch sensor, an optical joystick (OJ) sensor using optical technology, a physical button (for example, a tact switch), a display screen, and a microphone in order to receive various types of user commands according to an implementation type.

The plurality of speaker units included in the electronic device 100 may function to convert an electric pulse into a sound wave, and may be implemented in a dynamic type which is classified by a principle and a method of converting an electric signal into a sound wave. However, this should not be considered as limiting. The speaker units may be implemented in an electrostatic type, a dielectric type, a magnetostrictive type, or the like within the scope of the present disclosure.

Herein, the plurality of speaker units may perform roles of a plurality of channels, respectively, such as 2 channels, 2.1 channels, 3 channels, 3.1 channels, 5.1 channels, 7.1 channels, or the like, and may reproduce the channels. For example, the plurality of speaker units may include a left (L) channel speaker and a right (R) channel speaker. In the following description, it is assumed that the plurality of speaker units reproduce the L channel and the R channel, respectively, for convenience of explanation.

According to an exemplary embodiment, the electronic device 100 may individually perform rendering by dividing an inputted sound content into a center signal and an ambient signal when rendering sound signals to be outputted to the plurality of speaker units such that the electronic device 100 can provide a smart sound mode (or a smart audio mode) in which a voice is more clearly outputted and a sound effect is provided with a broader sound field. Hereinafter, various exemplary embodiments will be described with reference to the accompanying drawings.

Figure 2:
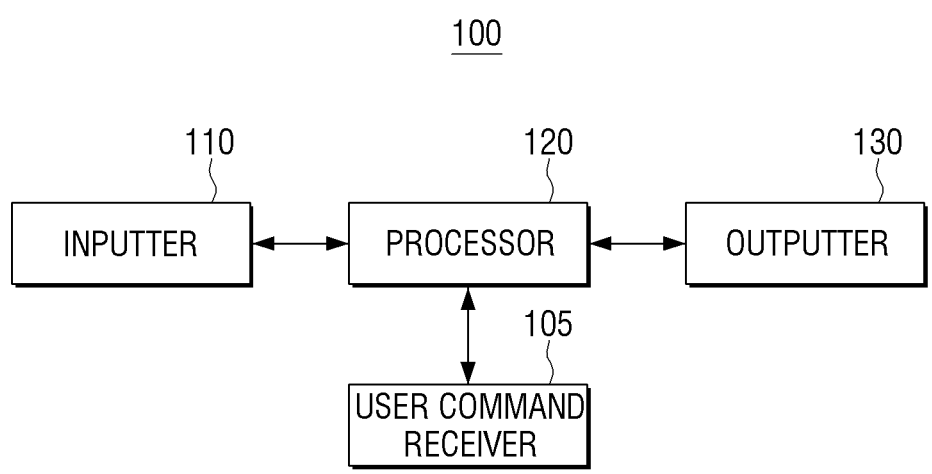
FIG. 2 is a block diagram showing a configuration of an electronic device according to an exemplary embodiment.

FIG. 2 is a block diagram showing a configuration of an electronic device according to an exemplary embodiment.

Referring to FIG. 2, the electronic device 100 includes a user command receiver 105, an inputter 110, a processor 120, and an outputter 130.

The user command receiver 105 receives various user commands. The user command receiver 105 may be implemented in various forms according to an implementation example of the electronic device 100. For example, when the electronic device 100 is implemented by using a digital TV, the user command receiver 105 may be implemented by using a remote control receiver for receiving a remote control signal from a remote control device (FIG. 1, 10), but is not limited thereto. The user command receiver 105 may be implemented by using a camera for receiving an input of a user motion, a microphone for receiving an input of a user voice, or a key provided on the electronic device 100.

The inputter 110 receives an input of a sound signal. Herein, the inputted sound signal may be a plurality of channel signals (for example, stereo signals). However, according to an exemplary embodiment, any signal that can be divided into a center signal and an ambient signal may be applied without a limitation. In this case, the sound signal may be a sound signal that is included in a sound content or may be a sound signal that is a part of an image content.

The processor 120 controls an overall operation of the electronic device 100. The processor 120 may include one or more of a central processing unit (CPU), a controller, an application processor (AP), a communication processor (CP), or an advanced RISC Machine (ARM) processor, or may be defined by a corresponding term.

In addition, the processor 120 may be implemented by using a digital signal processor (DSP), may be implemented by using a system on chip (SoC) having a content processing algorithm embedded therein, or may be implemented in the form of a field programmable gate array (FPGA).

According to an exemplary embodiment, in response to a predetermined event occurring, the processor 120 may provide a user interface (UI) for guiding entry to a smart sound mode, and, in response to the smart sound mode being selected according to a user command, may perform a signal processing operation according to the present disclosure. For example, the UI for guiding the entry to the smart sound mode may be implemented in at least one form of a UI for setting various functions of the electronic device 100 (quick settings UI), a UI for enabling entry to the smart sound mode while outputting a sound signal, and a UI for adjusting a smart sound effect. The UI for guiding the entry to the smart sound mode may be provided at various times such as before or while outputting a sound signal.

However, according to another embodiment, in the case of the electronic device 100 in which the smart sound mode according to the present disclosure is set as default, the corresponding signal processing operation may be applied regardless of a user command.

Hereinafter, a signal processing operation to provide a smart sound effect according to an exemplary embodiment will be described.

<Signal Division>

The processor 120 may divide an inputted sound signal into a first sound signal which is a common component among a plurality of channels, and a second sound signal which is a differential component among the plurality of channels. Herein, the first sound signal may be a center signal (or a primary signal), and the second sound signal may be an ambient signal (reverberation, applause, wind, various background sounds). In the following description, it is assumed that the plurality of channels are an L channel and an R channel for convenience of explanation.

It is common that, with respect to a sound outputted from the same sound source, collected signals vary according to locations of microphones. Since most of the sound sources generating voice signals like a singer or an announcer are located at the center of a stage, stereo signals generated with respect to the voice signal generated from the sound source located at the center of the stage, that is, an L signal and an R signal, are the same with each other. However, when the sound source is not located at the center of the stage, even the signals outputted from the same sound source may be different from each other in the intensity and the arrival time of the sound arriving at two microphones. Therefore, different signals are collected at the microphones and thus left and right stereo signals are also different.

In the present disclosure, a signal commonly included in stereo signals like a voice signal will be referred to as a center signal, and a differential component between stereo signals (for example, a center signal subtracted from a stereo signal) will be referred to as an ambient signal (or an ambient stereo signal).

<Signal Detection>

In response to the sound signal being divided into the first and second sound signals, the processor 120 may identify whether the first sound signal comprises a voice and whether the second sound signal comprise a sound effect. According to an exemplary embodiment, the processor 130 may detect whether a voice exists in the center signal and whether a sound effect exists in the ambient signal.

The processor 120 may identify a variation in a frequency in the first sound signal in the unit of a predetermined section (hereinafter, referred to as a detection section), and detect whether a voice exists in each detection section. In addition, the processor 120 may identify a variation in a frequency in the second sound signal in the unit of a predetermined detection section, and detect whether a sound effect exists in each detection section. Herein, the predetermined detection section unit may be, for example, at least one of at least one audio frame unit, at least one audio scene unit, and at least one audio chunk unit. Herein, the audio scene may be determined by detecting a silent section or a low energy section of an audio. Herein, the frequency variation may be a variation in a frequency size between a current detection section and at least one previous detection section. For example, the frequency variation may be a variation in a frequency size between the current frame and the at least one previous frame.

According to an exemplary embodiment, the processor 120 may detect whether a voice (or a sound effect) exists in each detection section by identifying the frequency variation with respect to each of the predetermined detection sections in the first sound signal (or the second sound signal). For example, when the predetermined detection section is one frame, the processor 120 may detect whether a voice (or a sound effect) exists in the unit of one frame.

According to another exemplary embodiment, the processor 120 may detect whether a voice exists in each detection section by identifying a frequency variation in the unit of a predetermined period with respect to the predetermined detection sections in the first sound signal (or the second sound signal). For example, when the predetermined detection section is one frame and the predetermined period is an interval of two frames, the processor 120 may detect whether a voice (or a sound effect) exists in the first frame, the third frame, the fifth frame, and so on. In this case, in response to a voice (or a sound effect) being detected from a current frame (fifth frame), a result of detection of the voice from the current frame may be equally applied to a voice (or a sound effect) of an adjacent frame (for example, the fourth frame or the fifth frame) of at least one frame from which a variation is not detected.

According to still another exemplary embodiment, in response to determining that a voice (or a sound effect) is detected from a predetermined number of continuous frames or is not detected, the processor 120 may adjust the period for detecting the voice (or sound effect). For example, in response to a voice (or a sound effect) being detected from the predetermined number of continuous frames as a result of detecting the voice (or sound effect) in the unit of one frame, the operation of detecting a voice (or sound effect) may be performed in the unit of two or more frames thereafter.

Hereinafter, the present disclosure will be described on the assumption that it is detected whether a voice (or a sound effect) exists in each detection section by identifying a variation in a frequency with respect to each of the predetermined detection sections for convenience of explanation.

According to an exemplary embodiment, the processor 120 may calculate a variation in a size of each frequency in each detection section of the first sound signal based on a relationship with at least one previous detection section, and, in response to the number of frequencies having a size variation greater than or equal to a threshold being greater than or equal to a threshold number, the processor 120 may detect that a voice exists in the corresponding section. In addition, the processor 120 may calculate a variation in a size of each frequency in each detection section of the second sound signal based on a relationship with at least one previous detection section, and, in response to the number of frequencies having a size variation greater than or equal to a threshold being greater than or equal to a threshold number, the processor 120 may detect that a sound effect exists in the corresponding section.

Specifically, the processor 120 may calculate a variation in a size of each frequency in each detection section of the first sound signal (or the second sound signal) based on a relationship with an immediately previous detection section, but may calculate a variation in a size of each frequency in at least three continuous detection sections.

For example, in response to the number of frequencies having a size variation greater than or equal to the threshold being greater than or equal to the threshold number as a result of comparing a current frame and a previous frame, the processor 120 may detect that a voice (or a sound effect) exists in the current frame. In another example, in response to the number of frequencies having a size variation greater than or equal to the threshold being greater than or equal to the threshold number in each of the at least three continuous frames, the processor 120 may detect that a voice exists in the current frame.

In other words, in response to the number of frequencies having a size variation greater than or equal to the threshold being greater than or equal to the threshold number in each detection section of the first sound signal, the processor 120 may determine that a dynamic component exists in the corresponding section and detect that a voice exists in the section. In response to the number of frequencies having a size variation greater than or equal to the threshold being greater than or equal to the threshold number in each detection section of the second sound signal, the processor 120 may determine that a dynamic component exists in the corresponding section and detect that a sound effect exists in the section.

Herein, each detection section of the first sound signal and each detection section and the detection period of the second sound signal may be the same with each other or different from each other. For example, a size variation of a frequency may be detected from both the center signal and the ambient signal in the unit of a frame. However, according to circumstances, a size variation of a frequency may be detected from the center signal in the unit of one frame (that is, a size variation regarding a previous frame), and a size variation of a frequency may be detected from the ambient signal in the unit of two frames (that is, a size variation regarding a previous frame and a frame preceding the previous frame).

In addition, the threshold number for the first sound signal and the threshold number for the second sound signal may be the same with each other or different from each other.

According to yet another exemplary embodiment, the processor 120 may detect a voice (or a sound effect) by applying a plurality of thresholds and a plurality of threshold numbers in each detection section of the first sound signal (or the second sound signal). For example, the processor 120 may calculate a variation in a size of each frequency in each detection section of the first sound signal (or the second sound signal) based on a relationship with at least one previous detection section, and, in response to the number of frequencies having a size variation greater than or equal to a first threshold being greater than or equal to a first threshold number, and the number of frequencies each having a size variation greater than or equal to a second threshold being greater than or equal to a second threshold number, the processor 120 may detect that a voice (or a sound effect) exists in the corresponding section.

According to further exemplary embodiment, in response to information on the size variation of each frequency in each detection section of the first sound signal being greater than or equal to a predetermined threshold, the processor 120 may detect that a voice exists in the corresponding detection section, and in response to information on the size variation of each frequency in each detection section of the second sound signal being greater than or equal to a predetermined threshold, the processor 120 may detect that a sound effect exists in the corresponding section. Herein, the information on the size variation of each frequency in each detection section may be, for example, a variance value or a standard deviation value regarding the size variation of each frequency in each detection section.

<Rendering>

Next, the processor 120 may individually render the first sound signal and the second sound signal based on the result of detection of the voice from the first sound signal and the result of detection of the sound effect from the second sound signal.

In this case, in response to the voice being detected from the first sound signal, the processor 120 may render the first sound signal by applying a predetermined weight value to a voice highlighting filter, and, in response to the sound effect being detected from the second sound signal, the processor 120 may render the second sound signal by applying a predetermined weight value to a sound effect highlighting filter.

For example, in response to the voice being detected from the center signal, the processor 120 may increase a gain applied to a center sound component, and, in response to the voice not being detected, the processor 120 may reduce the applied gain. In this case, the processor 120 may render the center signal by applying a weight value according to the gain applied to the voice highlighting filter.

In response to the sound effect being detected from the ambient signal, the processor 120 may increase a gain applied to a background sound component, and, in response to the sound effect not being detected, the processor 120 may reduce the applied gain. In this case, the processor 120 may render the ambient signal by applying a weight value according to the gain applied to the sound effect highlighting filter.

In addition, in response to determining that a musical element exists in at least one of the first and second sound signals, the processor 120 may render at least one of the first and second sound signals by applying a predetermined weight value to a music highlighting filter.

For example, the processor 120 may monitor whether a musical element exists based on similarity between the divided center signal and ambient signal, continuity, a change in energy, periodicity, a sound image (a location where a sound is formed), or the like. In response to the musical element being detected, the processor 120 may apply a weight value to the music highlighting filter. For example, in response to continuity being high, the processor 120 may determine that a musical element for a musical instrument such as a piano, a string instrument, or the like exists and may apply a weight value to the music highlighting filter. However, in response to a specific weight value being applied to the music highlighting filter, a weight value may be applied or may not be applied to the voice highlighting filter/sound effect highlighting filter according to a situation.

In particular, the processor 120 may render the first sound signal by applying a weight value to the voice highlighting filter in a predetermined rendering unit section based on whether a voice is detected from each detection section of the first sound signal, and may render the second sound signal by applying a weight value to the sound effect highlighting filter in a predetermined rendering unit section based on whether a sound effect is detected from each detection section of the second sound signal. Herein, the predetermined rendering unit section may be, for example, at least one of at least one audio frame unit, at least one audio scene unit, and at least one audio chunk unit. In addition, the predetermined rendering unit section may be the same as or different from the detection section for detecting a voice and a sound effect.

In addition, the processor 120 may render the first sound signal by updating a rendering parameter applied to each of the predetermined rendering unit sections based on whether a voice is detected from each detection section of the first signal, and may render the second sound signal by updating a rendering parameter applied to each of the predetermined rendering unit sections based on whether a sound effect is detected from each detection section of the second sound signal. For example, a basic rendering parameter may be pre-stored or may be received from an external server. The processor 120 may update at least a part of the basic rendering parameter based on whether a voice is detected from the first sound signal and whether a sound effect is detected from the second sound signal. Herein, the basic parameter may be a default parameter which is set based on a characteristic of the electronic device 100 regardless of a content genre, or may be a genre parameter which is set according to a content genre.

In addition, the processor 120 may render the first sound signal and the second sound signal based on at least one of device setting information related to the electronic device 100, viewing environment information, use history information, and sound content-related additional information. Herein, at least one of the device setting information, the viewing environment information, the use history information, and the sound content-related additional information may be stored in a memory (not shown) provided in the electronic device 100 or may be received from an external server (not shown).

Herein, the device setting information may include information on a current channel, a current volume, a currently set menu, or the like, and the viewing environment information may include information on a size/location/holding time of a user's voice, the number of users, a size/location/holding time of an ambient noise, a current time, or the like. In this case, the electronic device 100 may be provided with a voice detection sensor for detecting a user's voice, a noise sensor for detecting an ambient noise, or the like.

In addition, the sound content-related additional information may include information on a content genre (obtained from electronic program guide (EPG), event information table (EIT), extended text table (ETT), or the like), and the use history information may include information on a user's using pattern (for example, a device setting value change log), a user visit channel/program list, a preferred channel/program list registered by a user, scheduling information of channel/program scheduled for viewing by the user, and device setting values when an external media is connected. In this case, the processor 120 may provide optimum sound rendering to the user, while minimizing user's intervention in sound settings with reference to the rendering parameter learned/accumulated based on the user use history information.

The processor 120 may additionally determine a situation in which various rendering filters are applied based on the above-described additional information, or may adjust the weight values by limiting/changing the weight values applied to various filters.

For example, in response to a volume value of the electronic device 100 being less than or equal to a predetermined value, the processor 120 may increase the weight value of the voice highlighting filter and reduce the weight value of the sound effect highlighting filter since importance of delivering dialogue (or lines). In addition, in response to the volume value being greater than or equal a predetermined value, the processor 120 may determine that there is an intention to enjoy a sound and thus may increase the weight value of the sound effect highlighting filter and reduce the weight value of the voice highlighting filter.

According to another exemplary embodiment, it may be detected whether a voice exists in the center signal and whether a sound effect exists in the ambient signal in the form of an existence probability value. The processor 120 may filter each of the sound signals by applying a weight value corresponding to a detected probability value.

For example, in response to the number of frequencies having a size variation greater than or equal to the threshold being greater than or equal to the first threshold number in each detection section of the center signal, a first probability value may be detected, and, in response to the number of frequencies having a size variation greater than or equal to the threshold value being greater than or equal to the second threshold number, a second probability value may be detected. In this case, the processor 120 may filter the first sound signal by applying a first weight value corresponding to the first probability value to the voice highlighting filter, or may filter the second sound signal by applying a second weight value corresponding to the second probability value to the sound effect highlighting filter.

<Mixing and Outputting>

In addition, the processor_120 mixes the first sound signal and the second sound signal which are rendered into a plurality of output channels. Herein, the number of output channels may be the same as the number of input channels or may be smaller or larger than the number of input channels. For example, in response to the number of output channels being smaller than the number of input channels, the input channels may be downmixed according to the number of output channels. In another example, in response to the number of output channels being larger than the number of input channels, the input channels may be upmixed according to the number of output channels.

In this case, the processor 120 may include a mixer (or an audio mixer) to perform a mixing operation or may be implemented to control a separate mixer. For example, the mixer may be implemented to allow an input signal to be outputted through the output channel after passing an insert and a bus. The mixer may be referred to as a mixing console, a mixing desk, or a sound board, and may control an intensity and a tone of a sound and a phase and a surround image.

The outputter 130 outputs a multi-channel sound signal.

In this case, the outputter 130 may include a plurality of speaker units (or amplifiers) to output a multi-channel. For example, the outputter 130 may include an L channel speaker and an R channel speaker reproducing an L channel and an R channel, respectively.

Figure 3:
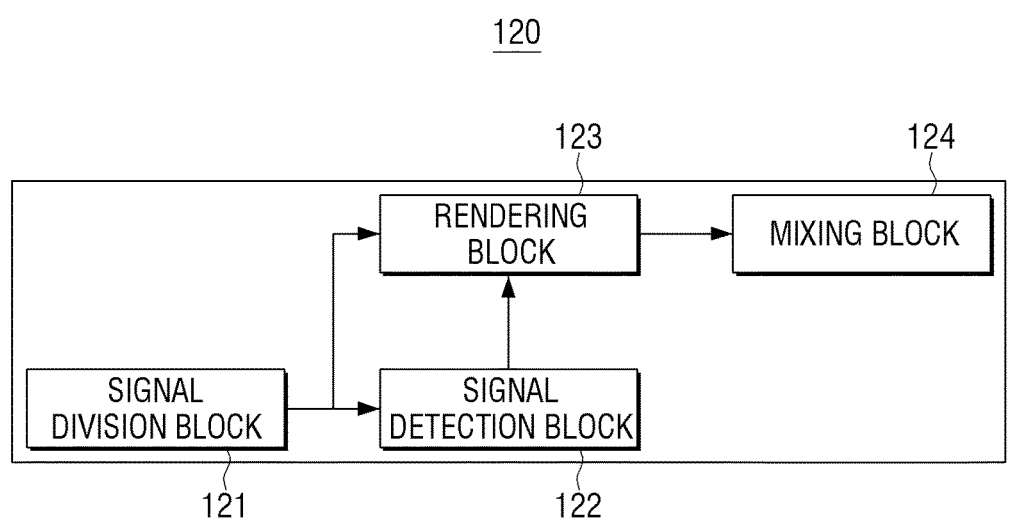
FIG. 3 is a view to illustrate a method for dividing a signal according to an exemplary embodiment.

FIG. 3 is a view to illustrate an operation of a processor to perform sound processing according to an exemplary embodiment.

According to an implementation example, the blocks illustrated in FIG. 3 may refer to pre-stored software modules that are used by the processor 120 to perform sound processing, or may refer to various functions performed in a chip (for example, a DSP chip) of the processor 120.

Referring to FIG. 3, the processor 120 includes a signal division block 121, a signal detection block 122, a rendering block 123, and a mixing block 124.

The signal division block 121 may divide an inputted sound signal into a first sound signal which is a common component among a plurality of channels forming the sound signal, and a second sound signal which is a differential component among the plurality of channels. For example, in response to a stereo sound signal including L/R channels being inputted, the signal division block 121 may divide the stereo sound signal into a center signal which is a common component between the L/R channels, and an ambient signal which is a differential component between the L/R channels.

The signal detection block 122 may detect whether a voice exists in the first sound signal, and detect whether a sound effect exists in the second sound signal. For example, the signal detection block 122 may detect whether a voice exists in the center signal and detect whether a sound effect exists in the ambient signal.

The rendering block 123 may individually render the first sound signal and the second sound signal based on whether a voice is detected from the first sound signal and whether a sound effect is detected from the second sound signal.

The mixing block 123 may mix the rendered first and second sound signals into a multi-channel sound signal.

Figure 4:
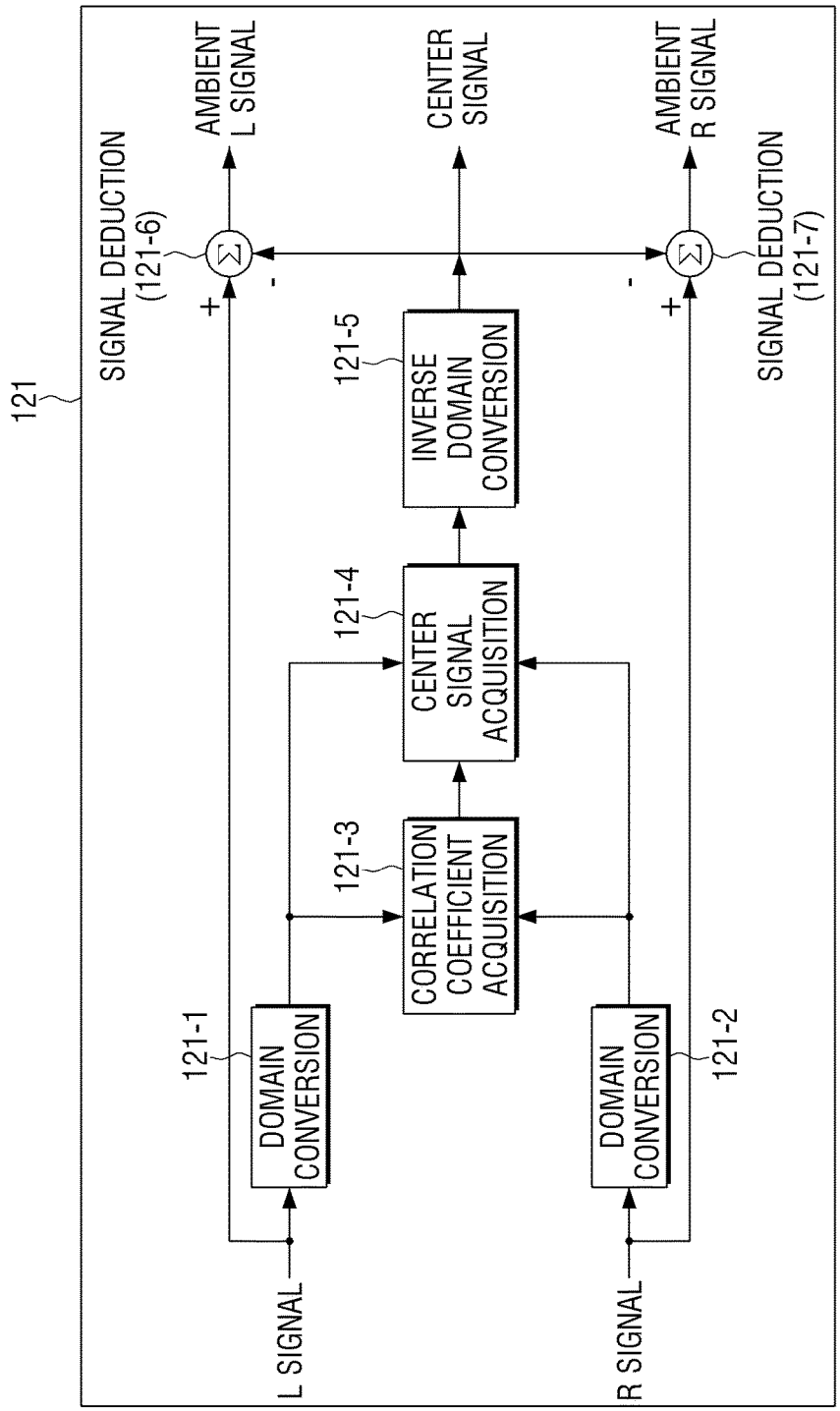
FIG. 4 is a view to illustrate a method for detecting a signal according to an exemplary embodiment.

FIG. 4 is a view to illustrate a detailed operation of the signal division block 121 of FIG. 3 according to an exemplary embodiment.

In FIG. 4, it is assumed that a stereo sound signal including L/R channels is divided into a center signal and an ambient signal for convenience of explanation.

The L channel signal and the R channel signal included in the inputted sound signal may be inputted to first and second domain conversion blocks 121-1 and 121-2, respectively, and the first and second domain conversion blocks 121-1 and 121-2 convert the domains of the L channel signal and the R channel signal, respectively. For example, the first and second domain conversion blocks 121-1 and 121-2 convert the stereo signal into time-frequency domains using an algorithm such as fast Fourier transform (FFT). The time-frequency domains may be used to express changes in time and frequency simultaneously, the sound signal may be divided into a plurality of sections (for example, frames) according to time and frequency values, and a signal in each frame may be expressed by frequency sub-band values at each time slot.

A correlation coefficient acquisition block 121-3 acquires a correlation coefficient using the stereo signal converted into time-frequency domains in the first and second domain conversion blocks 121-1 and 121-2. The correlation coefficient acquisition block 121-3 may acquire a first coefficient indicating coherence between the stereo signals, acquire a second coefficient indicating similarity between the two signals, and acquire a correlation coefficient using the first coefficient and the second coefficient. Herein, the coherence between two signals indicates a degree of relation between the two signals, and a related-art method may be used to acquire the first and second correlation coefficients and will not be described in detail. For example, a method disclosed in Journal of Audio Engineering Society, Vol. 52, No. 7/8, 2004 July/August "A frequency-domain approach to multichannel upmix" (written by Carlos Avendano) may be used to acquire the first and second correlation coefficients.

A center signal acquisition block 121-4 may extract a center signal from the stereo signal using the correlation coefficient acquired by the correlation coefficient acquisition block 121-3 and the stereo signal. For example, the center signal acquisition block 121-4 may obtain an arithmetic average of the stereo signal and generate a center signal by multiplying the arithmetic average with the correlation coefficient.

Next, the center signal acquisition block 121-4 transmits the center signal to an inverse domain conversion block 121-5, and the inverse domain conversion block 121-5 converts the center signal generated in the time-frequency domain into a time domain using an algorithm such as inverse fast Fourier transform (IFFT). The inverse domain conversion block 121-5 transmits the center signal converted into the time domain to first and second signal deduction blocks 121-6 and 121-7.

The first and second deduction blocks 121-6 and 121-7 obtains a difference between the stereo signal and the center signal in the time domain. That is, the first signal deduction block 121-6 obtains an ambient L signal by deducting the center signal from the L channel signal, and the second signal deduction block 121-7 generates an ambient R signal by deducting the center signal from the R channel signal.

However, the signal division method illustrated in FIG. 4 is merely an example describing an exemplary embodiment and is not limited to the corresponding embodiments. Various related-art signal division methods may be applied. For example, rather than the method of acquiring the correlation coefficient on the time-frequency domain, a method of acquiring a correlation coefficient on a time domain may be applied. In addition, besides the algorithm described in the above-described embodiments, various signal division algorithms such as a principal component analysis (PCA) algorithm, a modified PCA algorithm, or the like may be applied (J. Usher and J. Benesty, "Enhancement of spatial sound quality: A new reverberation-extraction audio upmixer," IEEE Trans. Audio, Speech, and Language Processing, vol. 15, no. 7, pp. 2141-2150, 2007, C. Faller, "Multiple-loudspeaker playback of stereo signals," J. AES, vol. 54, no. 11, pp. 1051-1064, 2006., S. W. Jeon, Y. C. Park, S. P. Lee, D. H. Yoon, "Robust Representation of Spatial Sound in Stereo-to Multichannel Upmix", AES convention, 2010, Goodwin. M. M., "Geometric Signal Decompositions for Spatial Audio Enhancement", IEEE ICASSP conf, pp 409-412, 2008, etc.).

In response to the number of input channels being larger than two channels, the channel division may be performed on various locations by binding two input channels and applying the center channel signal division technology multiple times, or by downmixing the input channels and then applying the center channel division technology FIGS. 5A to 5D are views to illustrate a detailed operation of the signal detection block 122 of FIG. 3 according to an exemplary embodiment.

Figure 5A:
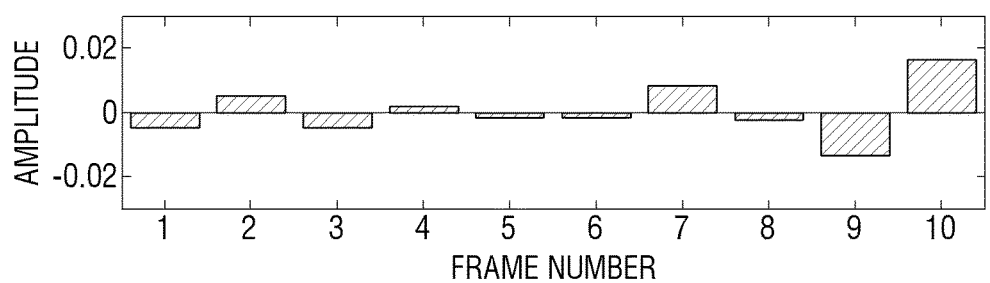
FIGS. 5A to 5D are views to illustrate a signal detection operation in detail according to an exemplary embodiment.

FIG. 5A is a view showing a signal size in each of predetermined detection section units (for example, a frame) of the center signal (or ambient signal). That is, FIG. 5A illustrates a signal size on the time axis of the center signal (or ambient signal).

Figure 5B:
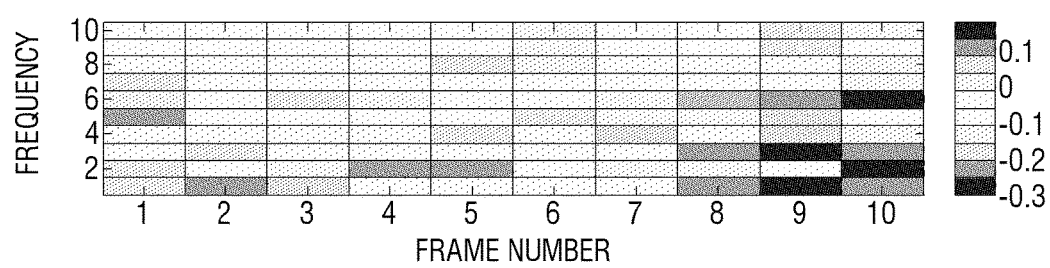

FIG. 5B is a view showing a distribution of frequencies included in each frame signal and a size of each frequency in a frequency domain after the center signal (or ambient signal) is converted by FFT according to an exemplary embodiment.

The signal detection block 122 may measure a size variation of each frequency in the unit of a predetermined detection section, i.e., in the unit of a frame, and calculate a size variation of each frequency in each frame. For example, the result thereof is illustrated in FIG. 5B.

Referring to FIG. 5B, the horizontal axis indicates frames arranged in a time sequence and the vertical axis indicates a frequency component of each frame. For convenience of explanation, each frequency (Hz) is expressed by indicators 1-10, and the size of the frequency is divided into a plurality of levels. The size level for each frequency component in each frame is displayed by a different type of hatching. Herein, when a section including 256 samples is one frame and 48000 samples are reproduced per one second, one frame section equals 256/48000=5.3 mm/sec.

Figure 5C:
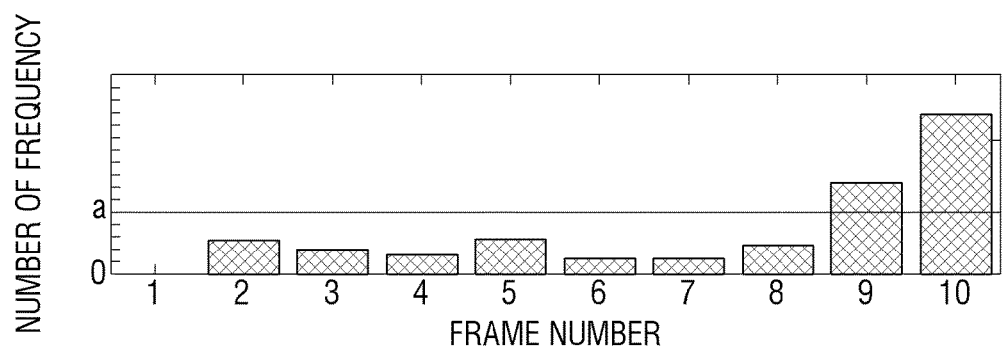

Next, the signal detection block 122 may calculate the number of frequencies having a size variation greater than or equal to a threshold in each frame, and the result of calculation is illustrated in FIG. 5C. That is, in FIG. 5C, the height of each bar indicates the number of frequencies having a size variation greater than or equal to the threshold in each frame based on a relationship with a previous frame. However, for convenience of explanation, only the frequency variation between a previous frame and a current frame is illustrated, but a frequency variation in three or more continuous frames may be used as described above.

In this case, the signal detection block 122 may determine that a voice (or a sound effect) is detected from a frame in which the number of frequencies having a size variation greater than or equal to the threshold is greater than or equal to a threshold number (for example, Nth).

However, according to another exemplary embodiment, the signal detection block 122 may measure a size variation of each frequency in the unit of a predetermined detection section, for example, in the unit of a frame, and may detect a voice (or a sound effect) based on information on the size variation of each frequency in each frame signal, for example, a variance value.

Figure 5D:
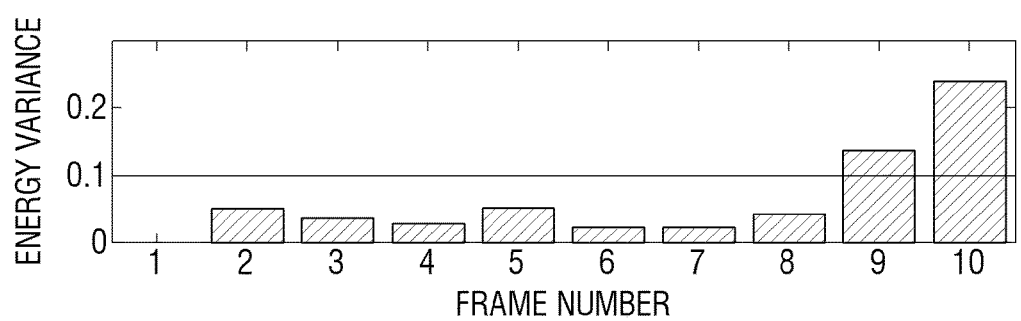

The signal detection block 122 may calculate a variance value of the size variation of each frequency on each frame based on the size variation of each frequency of each frame as shown in FIG. 5B, and the result of calculation is illustrated in FIG. 5D. That is, the height of each bar in FIG. 5D indicates a variance value of the size variation of each frequency in each frame.

In this case, the signal detection block 122 may determine that a voice (or a sound effect) is detected from a frame in which the variance value of the size variation of each frequency is greater than or equal to a threshold (for example, 0.1).

Figure 6:
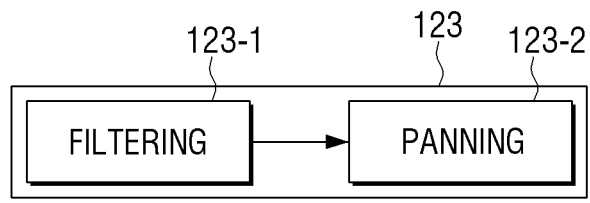
FIG. 6 is a view to illustrate a rendering operation according to an exemplary embodiment.

FIG. 6 is a view to illustrate a detailed operation of the rendering block 123 of FIG. 3 according to an exemplary embodiment. The rendering block 123 includes a filtering block 123-1 and a panning block 123-2.

Referring to FIG. 6, the filtering block 123-1 may filter the first and second sound signals based on whether a voice or a sound effect is detected.

The filtering block 123-1 may filter the first and second sound signals using a voice highlighting filter (or a center sound component rendering filter), a sound effect highlighting filter (or a background sound component rendering filter), a music highlighting filter, or the like. In this case, various filters such as a high pass filter, a low pass filter, a band pass filter, a mask filter, a head-related transfer function (HRTF) filter, or the like may be used.

The voice highlighting filter may perform filtering based on a rendering parameter which is able to adjust voice intelligibility and a degree of voice highlighting, and the sound effect highlighting filter may perform filtering based on a rendering parameter which is able to adjust a surrounding effect of a sound effect and a degree of extension of a sound stage.

The filtering block 123-1 may render the center signal by applying a weight value to the voice highlighting filter in a predetermined rendering unit section based on whether a voice is detected in each detection section of the center signal, and may render the ambient signal by applying a weight value to the sound effect highlighting filter in a predetermined rendering unit section based on whether a sound effect is detected in each detection section of the ambient signal.

The rendering parameter may be updated in the unit of the predetermined rendering section. For example, the unit of the predetermined rendering section may be, for example, at least one of at least one audio frame unit, at least one audio scene unit, and at least one audio chunk unit. In addition, the unit of the predetermined rendering section may be the same as or different from the unit of the detection section for detecting a voice and a sound effect.

In this case, in response to there being no voice (or sound effect) detected in a specific rendering unit section, the filtering block 123-1 may perform rendering by applying a rendering parameter in a rendering unit section belonging to a predetermined time range, for example, an adjacent rendering unit section.

A panning module 123-2 may obtain a panning coefficient (or a panning gain) to be applied to each frequency band or each channel in order to pan the first and second sound signals with respect to each output channel, and apply the panning coefficient. Panning a sound signal refers to controlling the size of a signal applied to each output channel to render a sound source at a specific location between two output channels.

Figure 7:
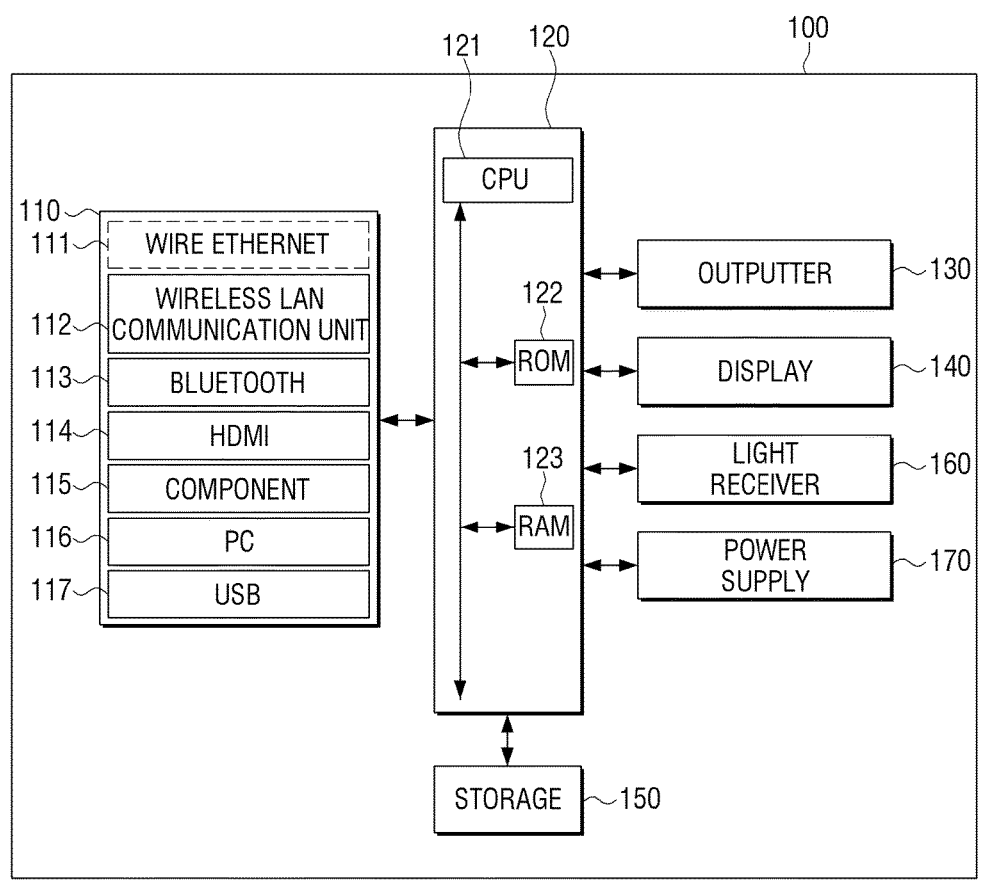
FIG. 7 is a block diagram showing a detailed configuration of the electronic device of FIG. 2.

FIG. 7 is a block diagram showing a detailed configuration of the electronic device illustrated in FIG. 2.

Referring to FIG. 7, the electronic device 100 includes an inputter 110, a processor 120, an outputter 130, a display 140, a storage 150, a light receiver 160, a power supply 170, or the like. From among the elements illustrated in FIG. 7, the same elements as illustrated in FIG. 2 will not be described in detail.

The inputter 110 may be connected with an external source in a wire or wireless manner to receive various contents. For example, the inputter 110 may receive an input of a content including at least one of a sound (audio), a video, an image, and a text. Herein, the content may be various types of contents such as a terrestrial broadcasting content, a cable content, a social content, a video on demand (VOD) content, a Web content, or the like. According to the performance and configuration of the electronic device 100, the input unit 110 may include at least one of a wire Ethernet 111, a wireless local area network (LAN) communication unit 112, a Bluetooth communication unit 113, a high definition multimedia interface (HDMI) input port 114, a component input jack 115, a PC input port 116, and a universal serial bus (USB) input jack 117. According to an exemplary embodiment, the inputter 110 may be implemented to include a tuner for receiving a broadcast signal.

The processor 120 may include a central processing unit (CPU) 121, a read only memory (ROM) (or a nonvolatile memory) 122 which stores a control program for controlling the electronic device 100, and a random access memory (RAM) (or a volatile memory) 123 which stores data inputted from the outside of the electronic device 100 or is used as a storage region corresponding to various tasks performed in the electronic device 100.

The processor 120 may control power supplied to the inner elements 110-160 from the power supply 170. In addition, in response to a predetermined event occurring, the processor 120 may execute an operating system (OS) and various applications stored in the storage 150.

The processor 120 may include a graphic processing unit (GPU) (not shown) to process graphics corresponding to an image. The processor 120 may be implemented by using a System On Chip (SoC) including a core (not shown) and a GPU (not shown). The processor 120 may include a single core, a dual core, a triple core, a quad core, and a core of a multiple thereof.

The CPU 121 may access the storage 150 and performs booting using an OS stored in the storage 150. In addition, the CPU 121 performs various operations using various programs, contents, and data stored in the storage 150.

The ROM 122 stores a set of commands for booting a system. In response to a turn-on command being inputted and power being supplied, the CPU 121 copies the OS stored in the storage 150 onto the RAM 123 according to the command stored in the ROM 122, executes the OS and boots the system. In response to booting being completed, the CPU 121 copies various programs stored in the storage 150 onto the RAM 123, executes the programs copied onto the RAM 123, and performs various operations. Herein, the CPU 121, the ROM 122, and the RAM 123 may be connected with one another through an internal bus.

In addition, the processor 120 may include a digital signal processor (DSP), and the DSP may add various functions such as a digital filter, an effect, a sound field, or the like and may apply an oversampling technique for preventing deterioration of a sound quality when digital analogue conversion is performed through a sample rate converter (SRC).

The outputter 130 may include a plurality of speakers for reproducing a multi-channel. For example, the outputter 130 may include a plurality of speakers performing roles of the channels through which signals are mixed and outputted. According to circumstances, a speaker performing a role of at least one channel may be implemented by using a speaker array including a plurality of speaker units for reproducing different frequency bands.

The display 140 may provide various content screens which can be provided through the electronic device 100. Herein, the content screen may include various contents such as an image, a moving image, a text, music, or the like, an application execution screen including various contents, a GUI screen, or the like. In particular, the display 140 may display various UIs related to a smart sound mode according to an exemplary embodiment.

For example, in response to a predetermined event occurring, the processor 120 may provide at least one of a UI for enabling entry to a smart sound mode according to an exemplary embodiment and a UI for adjusting a smart sound effect through the display 140. Herein, the predetermined event may include at least one of an event of pressing a predetermined button (or key) provided on the remote control device 10 controlling the electronic device 100, and an event of outputting a sound portion appropriate to apply the smart sound mode.

In this case, in response to the event of pressing the predetermined button (or key) or the event of outputting the sound portion appropriate to apply the smart sound mode occurring, the processor 120 may provide a corresponding guide UI, or, in response to the event of pressing the predetermined button (or key) occurring at the same as the event of outputting the sound portion appropriate to apply the smart sound mode, the processor 120 may provide a corresponding guide UI.

In addition, the processor 120 may provide a UI of a different form based on a pressing pattern of a predetermined button, the number of times of pressing, a pressing interval, or the like, or may control the provided UI differently. For example, in response to the predetermined button being pressed and released, the processor 120 may display the UI for enabling entry to the smart sound mode, and, in response to the predetermined button being pressed and held, the processor 120 may disable the smart sound mode. Relevant various exemplary embodiments will be described in detail with reference to the drawings.

In addition, the display 140 may be implemented by using various types of displays such as a liquid crystal display (LCD), an organic light emitting diode (OLED), a liquid crystal on silicon (LCoS), digital light processing (DLP), or the like. In addition, the display 140 may be implemented by using a transparent display which is made of transparent material and displays information. In addition, the display 140 may be implemented in the form of a touch screen forming an interlayered structure with a touch pad according to circumstances. In this case, the display 140 may be used as a user interface in addition to an output device.

The storage 150 may store various data for driving/controlling the electronic device 100, programs, or applications.

The storage 150 may store a control program for controlling the electronic device 100 and the processor 120, an application which is initially provided by a manufacturer or downloaded from the outside, a graphical user interface (hereinafter, referred to as a "GUI") related to an application, an object for providing a GUI (for example, an image text, an icon, a button, or the like), user information, a document, databases, or relevant data.

In particular, the storage 150 may store at least one of device setting information used to render a sound signal according to an exemplary embodiment, viewing environment information, use history information, and sound content-related additional information. In addition, the storage 150 may store various parameters for processing a sound (for example, a rendering parameter).

The storage 150 may include a broadcast reception module, a channel control module, a volume control module, a communication control module, a voice recognition module, a motion recognition module, a light reception module, a display control module, an audio control module, an external input control module, a power control module, a voice database (DB), or a motion database (DB).

The storage 150 may include a memory card (for example, a micro SD card, a USB memory, or the like) mounted in the electronic device 100, an external memory (for example, a USB memory or the like) connectable to a USB port, a nonvolatile memory, a volatile memory, a hard disk drive (HDD), or a solid state drive (SSD).

The light receiver 160 receives a light signal (including control information) outputted from the remote control device 10 (see FIG. 1) through a light window (not shown). The light receiver 160 may receive a light signal corresponding to a user input (for example, a touch, pressing, a touch gesture, a voice, or a motion) from the remote control device 10. In this case, control information extracted from the received light signal may be transmitted to the processor 120.

The power supply 170 supplies power inputted from an external power source to the inner elements 110-160 of the electronic device 100 under the control of the processor 120.

FIGS. 8 to 10D are views to illustrate a method for providing a UI according to an exemplary embodiment.

Figure 8:
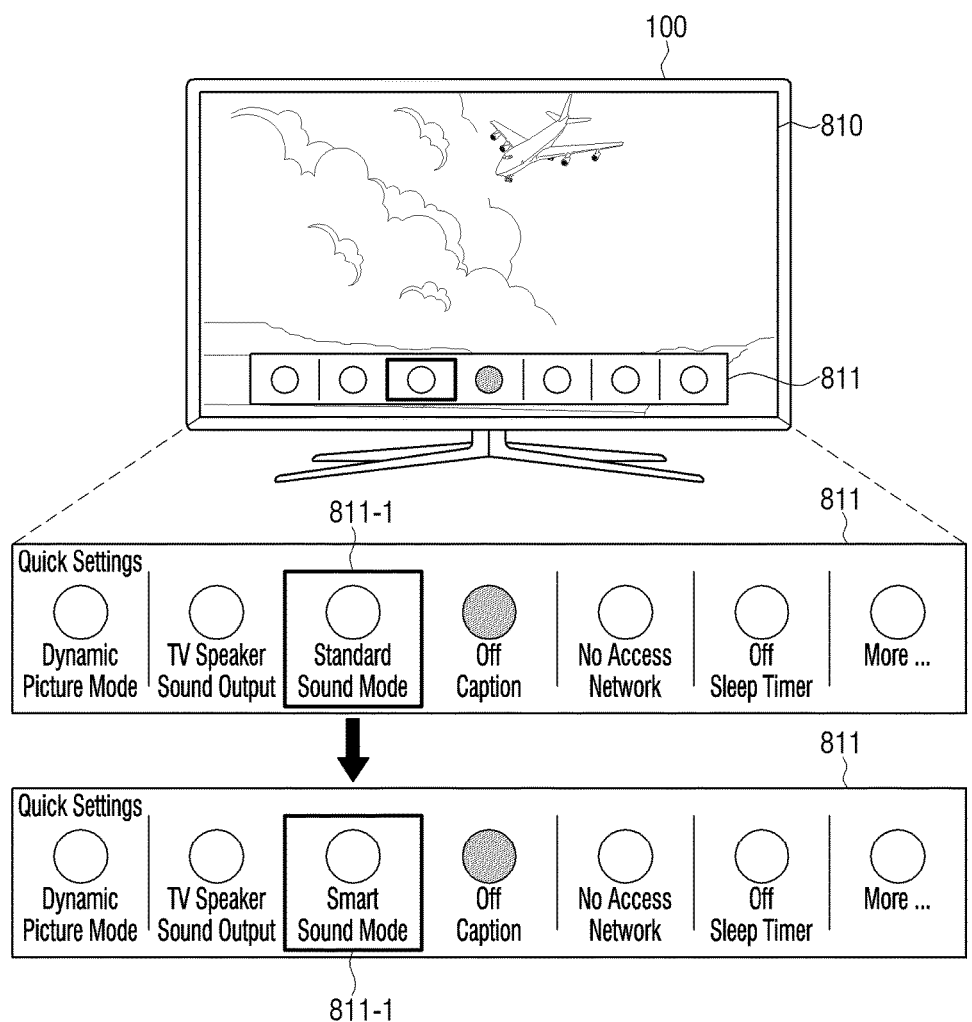
FIGS. 8 to 10D are views to illustrate a method for providing a UI according to an exemplary embodiment.

FIG. 8 is a view showing a UI screen for setting a smart sound mode according to an exemplary embodiment.

As shown in FIG. 8, a quick settings UI 811 may be provided on a screen 810 according to a predetermined event. Herein, the predetermined event may be an event of pressing a specific button (for example, a home button) provided on the remote control device 10, but is not limited thereto.

Herein, from among a plurality of menus included in the quick settings UI 811, a sound mode setting menu 811-1 may be set as "Standard Sound Mode."

The sound mode setting menu 811-1 may be changed to "Smart Sound Mode" in a toggle method. That is, in response to the user selecting the corresponding menu, the menu may be changed to "Smart Sound Mode" as shown in the drawing. In response to "Smart Sound Mode" being selected in this way, a sound may be outputted according to the smart sound mode according to the above-described embodiment.

Although the quick setting UI 811 is illustrated in FIG. 8, there is no limit if any UI including the sound mode setting menu 811-1 is provided.

Figure 9:
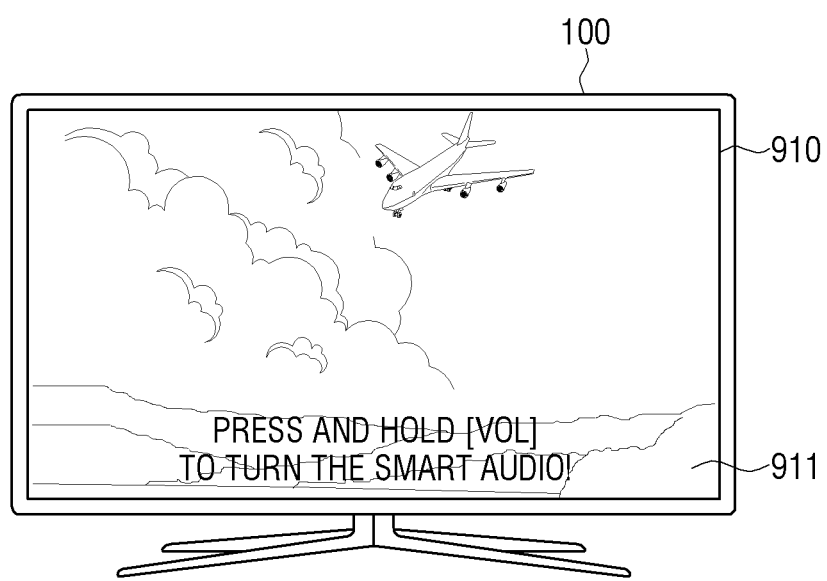

FIG. 9 is a view showing a UI screen for setting a smart sound mode according to another exemplary embodiment.

As shown in FIG. 9, the electronic device 100 may provide a UI for setting a smart sound mode at an appropriate time while a user is viewing. For example, in response to a specific button (for example, a button for controlling a volume or changing a channel) provided on the remote control device 10 being pressed at the same as determining that it is necessary to set the smart sound mode, the electronic device 100 may provide the UI for setting the smart sound mode to guide user's setting.

For example, the electronic device 100 may monitor whether a content is effective in applying the smart sound mode in real time by analyzing a sound. For example, as shown in FIGS. 5A to 5D, the electronic device 100 may monitor a size variation of each frequency in the unit of each frame with respect to the center signal and the ambient signal, and may determine whether a currently outputted content is effective in applying the smart sound mode based on the number of frames in which the number of frequencies having a size variation greater than or equal to a threshold is greater than or equal to a threshold number (for example, Nth). For example, in response to a ratio of the number of frames satisfying the corresponding condition to the number of frames outputted up to the present time being greater than or equal to a predetermined threshold ratio, it may be determined that the currently outputted content is effective in applying the smart sound mode.

In response to determining that the currently outputted content is effective in applying the smart sound mode, the electronic device 100 may provide a UI 911 for recommending the smart sound mode on a screen 910 at the moment when the user presses a specific button of the remote control device 10. In this case, the corresponding UI may include a content for guiding a user operation for entering the smart sound mode. For example, the UI may include a content guiding the user to press and hold a volume button (or volume key) as shown in the drawing. However, in another example, the UI may include a content simply recommending the smart sound mode, for example, "Setting the smart sound mode is recommended." According to circumstances, the corresponding guide may be provided as a voice.

In response to the guided user operation (for example, pressing and holding the volume button) not being inputted within a predetermined time, the displayed UI may automatically disappear. Alternatively, in response to an operation other than the corresponding operation (for example, pressing a channel button) being inputted, the displayed UI may automatically disappear.

In the above-described embodiments, in response to a user's specific operation being inputted, the UI related to the setting of the smart sound mode is provided. However, according to another exemplary embodiment, in response to determining that the smart sound mode is appropriate to apply simply by analyzing a sound content although there is not user's specific operation, the corresponding UI may be automatically provided.

Figure 10A:
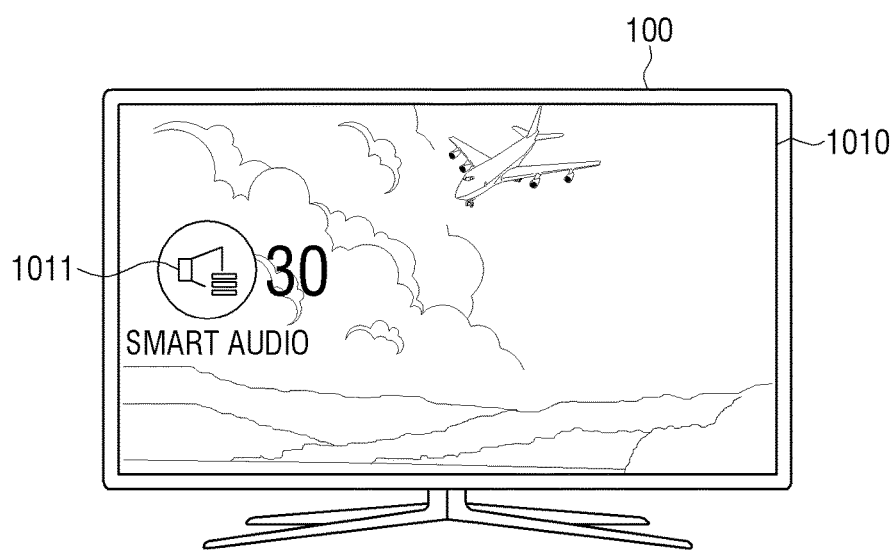
Figure 10B:
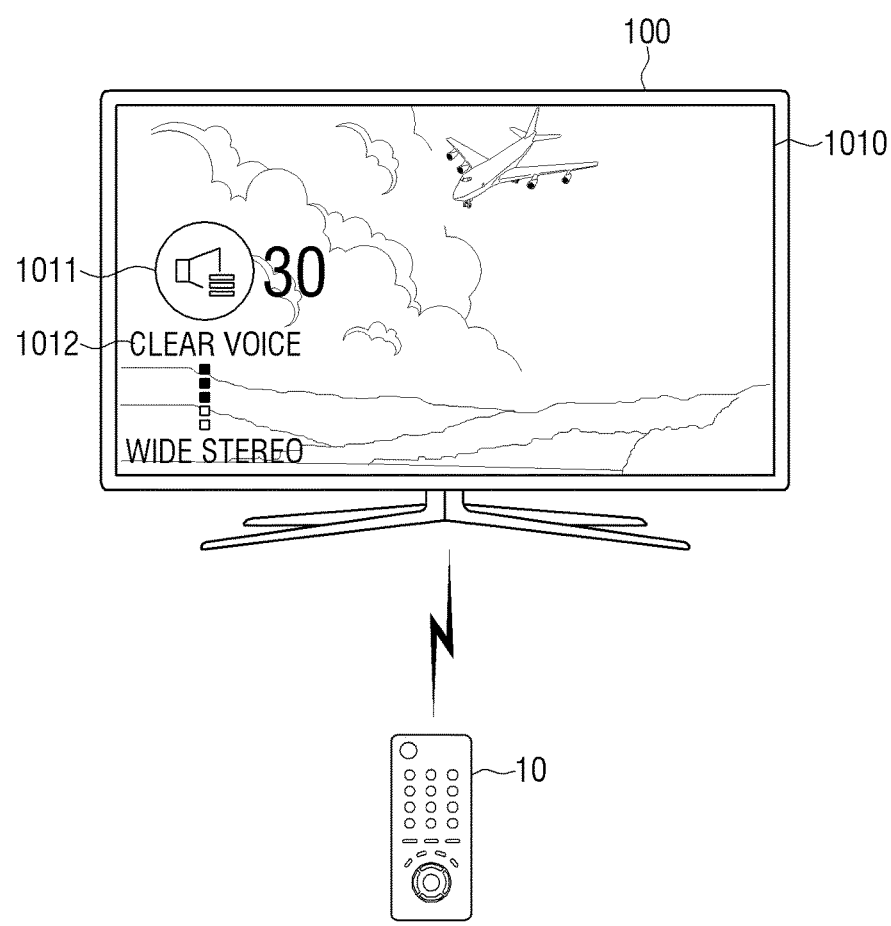

FIGS. 10A and 10B are views showing a UI screen for setting a smart sound mode according to still another exemplary embodiment.

As shown in FIG. 10A, the electronic device 100 may provide smart sound setting 1011 at an appropriate time while a user is viewing. For example, as shown in FIG. 10A, the electronic device 100 may provide the UI 1011 for selecting the smart sound mode on a screen 1010 when the user presses a specific button (for example, a volume button) of the remote control device 10. Alternatively, even in response to there being no user's operation, the electronic device 100 may provide the UI 1011 for selecting the smart sound mode at an appropriate time according to a result of analyzing a sound content.

In this case, the corresponding UI 1011 may be displayed so as to be selectable. In response to the corresponding UI 1011 being selected (for example, in response to a select button (OK button) being pressed), the electronic device 100 may enter the smart sound mode. For example, the corresponding UI 1011 in the activation state is inactivated by user's selection and the electronic device 100 enters the smart sound mode. The corresponding UI 1011 may be implemented to disappear on the screen after a predetermined threshold time elapses regardless of whether the user selects or not.

Alternatively, as shown in FIG. 10B, the electronic device 100 may provide a UI screen which can reflect user's preference on a smart sound effect.

As shown in FIG. 10B, the electronic device 100 may provide a UI 1012 for enabling the user to adjust the smart sound effect at an appropriate time while the user is viewing. For example, in response to a specific button (for example, a button for controlling a volume or changing a channel) provided on the remote control device 10 being pressed, the electronic device 100 may provide a UI for adjusting the smart sound effect to guide user's setting. For example, the electronic device 100 may provide a UI for the user to select whether to highlight a clear voice or whether to highlight a wide stereo effect.

For example, as shown in FIG. 10B, the electronic device 100 may provide the smart sound effect adjustment UI 1012 on the screen 1010 when the user presses a specific button (for example, a volume button) of the remote control device 10. In this case, the smart sound effect may be adjusted by controlling UP/DOWN of the volume button. That is, in response to a UP direction volume button being pressed as shown in the drawing, voice intelligibility may more be highlighted, and, in response to a DOWN direction volume button being pressed, the smart sound effect may be adjusted to more highlight a stereo effect.

Figure 10C:
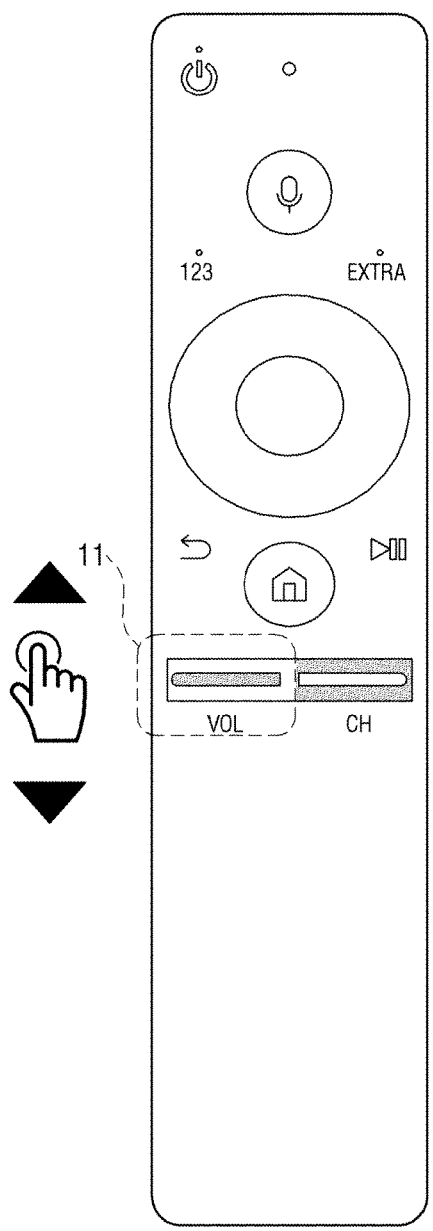

The button provided on the remote control device 10 may be implemented in various forms, and the smart sound effect may be adjusted based on various types of operations according to an implementation form. For example, as shown in FIG. 10C, a volume button 11 provided on the remote control device 10 may be implemented to be pressable and may be provided in a hole having moving spaces formed on upper and lower portions thereof and may be physically movable to the upper and lower spaces. In this case, the user may adjust the smart sound effect by moving the volume button 11 up/down while pressing the volume button 11, that is, by holding up/down. For example, in response to the volume button 11 being held up and down, the voice intelligibility may be more highlighted, and, in response to the volume button 11 being held down, the smart sound effect may be adjusted to more highlight the stereo effect.

According to another exemplary embodiment, a button for selecting the smart sound mode of the present disclosure may be separately provided. In this case, the smart sound mode may be selected or disabled according to an operation type of the corresponding button. For example, in response to the smart sound setting UI 1011 being provided as shown in FIG. 10A and the corresponding button being pressed and released, the electronic device 100 may enter the smart sound mode, and in response to the button being pressed and held, the smart sound mode may be disabled. However, the smart sound setting UI 1011 may be provided in the form of a voice.

Alternatively, the smart sound mode may be selected and disabled based on a current mode regardless of an operation type. For example, in response to the smart sound setting UI 1011 being provided as shown in FIG. 10A and the corresponding button being pressed, the smart sound mode may be selected, and, in response to the corresponding button being pressed in the smart sound mode state, the smart sound mode may be disabled.

Alternatively, in response to the corresponding button being pressed and released and the electronic device entering the smart sound mode, the functions of buttons provided on the remote control device 10 may be remapped so as to correspond to the smart sound mode. For example, after the electronic device 100 enters the smart sound mode, a function of adjusting the level of the smart sound effect may be mapped onto up/down buttons (or left/right buttons). Accordingly, in response to the up button being pressed, the smart sound effect may increase, and, in response to the down button being pressed, the smart sound effect may decrease.

Alternatively, different smart sound functions may be mapped onto the up/down buttons and the left/right buttons. For example, a voice highlighting function may be mapped onto the up/down buttons, and, in response to the up button being pressed, a voice highlighting effect may increase, and, in response to the down button being pressed, the voice highlighting effect may decrease. In addition, a sound effect (or a sound field) highlighting function may be mapped onto the left/right buttons, and, in response to the right button being pressed, the sound field highlighting effect may increase, and, in response to the left button being pressed, the sound field highlighting effect may decrease.

According to still another exemplary embodiment, a button for adjusting the smart sound effect may be separately provided, and, for example, may be implemented in the form of a volume button as shown in FIG. 10C. In this case, in response to the user pressing the corresponding button 11, the electronic device 100 may enter the smart sound mode, and, in response to the user moving up while still pressing the key (hold/up), the smart sound effect may increase, and, in response to the user moving down while still pressing the key (hold/down), the smart sound effect may decrease. In addition, in response to the corresponding button 11 being pressed and held, the smart sound mode may be disabled.

According to yet another exemplary embodiment, a button for adjusting the smart sound effect may be separately provided, and the user may directly set a parameter for providing the smart sound effect by pressing the corresponding button.

For example, in response to the user pressing and releasing the corresponding button to enter the smart sound mode, the electronic device 100 enters the smart sound mode. In this case, the smart sound effect may be provided by a set of setting values which is stored with highest priority from among a plurality of parameter setting values for providing the smart sound effect.

Next, in response to the user pressing the corresponding button again, the priority of the sets of parameter setting values for providing the smart sound effect may be changed and stored. For example, the electronic device 100 may store a plurality of sets of setting values including parameter setting values for providing various sound effects. The plurality of sets of setting values may include the parameter setting values for highlighting a voice in various phases or highlighting a sound field in various phases.

In this case, the electronic device 100 may change the priority of the sets of setting values every time the corresponding button is pressed, and may provide the smart sound effect based on the sets of setting values with highest priority based on the changed priority. That is, in response to the user not being satisfied with the currently provided smart sound effect, the user may adjust the smart sound effect by pressing the corresponding button, and, in response to a smart sound effect desired by the user being provided, the user may stop pressing the corresponding button. Accordingly, the user can be provided with the smart sound effect as desired by the user with only one button.

When the electronic device 100 enters the smart sound mode afterward, the electronic device 100 may provide the smart sound effect based on a set of parameter setting values corresponding to the smart sound effect.

In further exemplary embodiment, a button for adjusting the smart sound effect may be separately provided, and the user may be provided with a UI for directly setting a parameter for providing the smart sound effect by pressing the corresponding button.

Figure 10D:
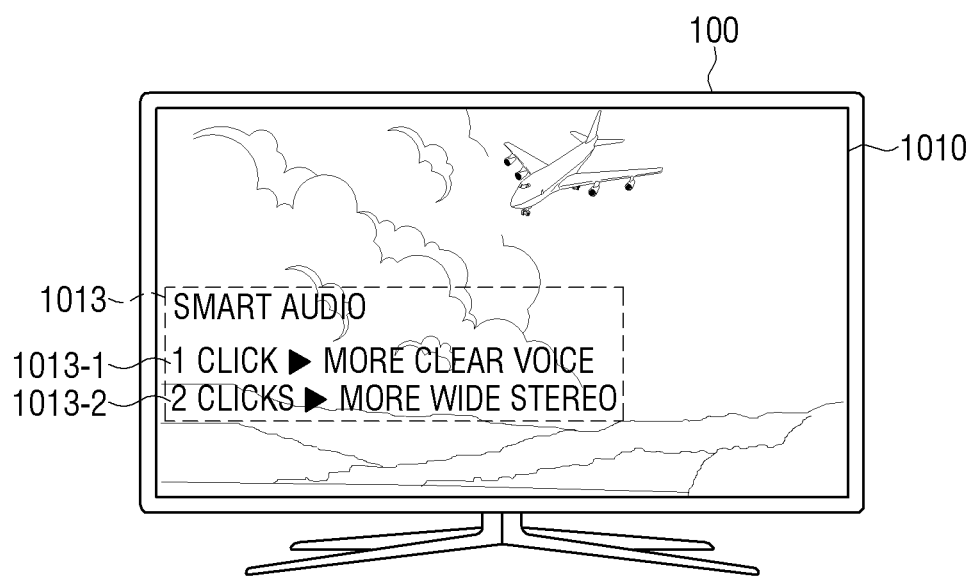

For example, in response to the user pressing and releasing the corresponding button to enter the smart sound effect, a UI screen 1013 including a plurality of selection menus corresponding to various smart sound effects may be provided as shown in FIG. 10D. For example, the UI screen 1013 including a "more Clear Voice" menu 1013-1 for more highlighting a voice and a "more Wide Stereo" menu 1013-2 may be provided. In this case, the user may navigate on two menus through a direction button separately provided on the remote control device 10 and may select a specific menu through a selection button (for example, an OK button or the above-described corresponding button). Alternatively, the specific menu may be selected based on the number of times the corresponding button is pressed, or may be selected by a number button. For example, menu 1 1013-1 may be selected in response to the corresponding button being pressed once and menu 2 1013-2 may be selected in response to the button being pressed two times. In addition, menu 1 1013-1 may be selected in response to a number 1 button being pressed, and menu 2 1013-2 may be selected in response to a number 2 button being pressed.

In this case, in response to the specific menu being selected, a function corresponding to the corresponding menu may be performed or a sub-menu of the corresponding menu may be provided. For example, in response to the "more Clear Voice" menu 1013-1 being selected, the electronic device 100 may provide a smart sound effect highlighting a voice more or may provide a sub menu including a plurality of voice highlighting levels, such that the user can select a desired one from among the plurality of voice highlighting levels.

Alternatively, in a state in which a cursor (or highlight) is placed on the specific menu, a corresponding level of the smart sound effect may be selected based on the number of times the corresponding button is pressed. For example, in a state in which the cursor (or highlight) is placed on the "more Clear Voice" menu 1013-1, a voice highlighting level may be selected based on the number of times the corresponding button is pressed and released. For example, in response to the button being pressed once, the smart sound effect may be provided based on a set of parameter setting values highlighting a voice by a first level, and, in response to the button being pressed two times, the smart sound effect may be provided based on a set of parameter setting values highlighting a voice by a second level.

The above-described various exemplary embodiments may be combined in various forms and provided as new exemplary embodiments. For example, when the remote control device 10 shown in FIG. 10C is used in the embodiment shown in FIG. 9, the UI 911 for recommending the smart sound mode may be made to disappear on the screen by pressing and holding the corresponding button 11.

In addition, in the above-described embodiments, the electronic device 100 is controlled through the remote control device 10. However, the corresponding embodiments may be applied by a button provided on the electronic device 100. For example, the electronic device 100 may enter the smart sound mode in response to the user pressing and releasing a specific button provided on the electronic device 100, or may disable the smart sound mode in response to the user pressing and holding the corresponding button.

Figure 11:
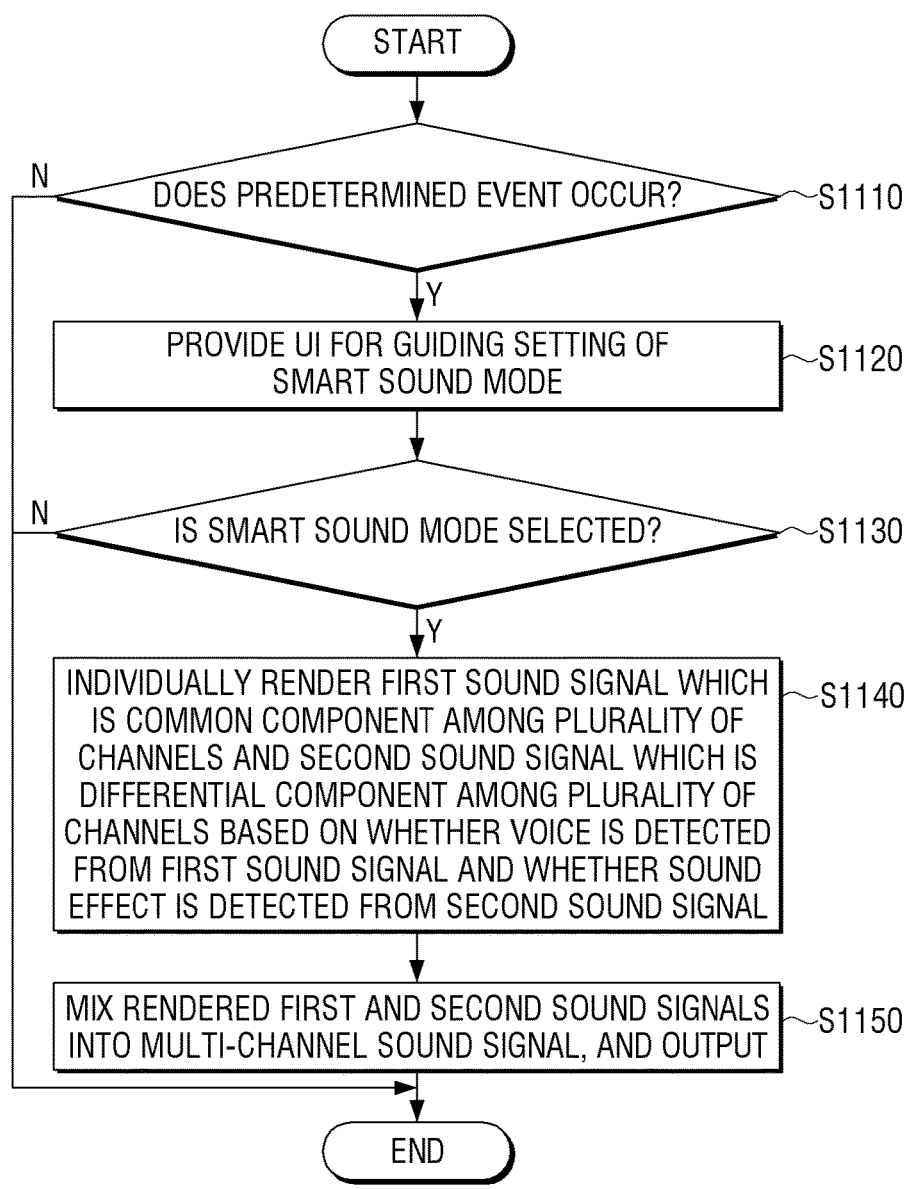
FIG. 11 is a flowchart to illustrate a control method of an electronic device according to an exemplary embodiment.

FIG. 11 is a flowchart to illustrate a control method of an electronic device according to an exemplary embodiment.

According to a control method of an electronic device providing a smart sound mode as illustrated in FIG. 11, in response to a predetermined event occurring (S1110: Y), a UI for guiding entry to a smart sound mode is provided (S1120). Herein, the predetermined event may include at least one of an event of pressing a predetermined button provided on a remote control device controlling the electronic device 100 as described in FIGS. 8 to 10D, an event of pressing a predetermined button provided on the electronic device 100, and an event of outputting a sound portion appropriate to apply the smart sound mode. In addition, the guide UI may be provided in the form of an audio or may be displayed through the display 140 (see, FIG. 7). When the guide UI is provided through the display 140, the UI may be provided in various forms described in FIGS. 8 to 10D.

Next, in response to the smart sound mode being selected according to a user command (S1130: Y), a first sound signal which is a common component among a plurality of channels forming the sound signal and a second sound signal which is a differential component among the plurality of channels are individually rendered based on whether a voice is detected from the first sound signal and whether a sound effect is detected from the second sound signal (S1140).

Thereafter, the first and second sound signals which are rendered are mixed into a multi-channel sound signal, and the multi-channel sound signal is outputted (S1150).

In addition, in step S1140 of rendering, a frequency variation is identified in the first sound signal in the unit of a predetermined section, and it is identified whether a voice exists in each section, and a frequency variation is identified in the second sound signal in the unit of a predetermined section, and it is identified whether a sound effect exists in each section.

In addition, in step S1140 of rendering, in response to a number of frequencies having a size variation greater than or equal to a threshold being greater than or equal to a threshold number in each section of the first sound signal, it is identified that the voice exists in a corresponding section, and, in response to a number of frequencies having a size variation greater than or equal to a threshold being greater than or equal to a threshold number in each section of the second sound signal, it is identified that the sound effect exists in a corresponding section.

In addition, in step S1140 of rendering, the first sound signal is rendered by applying a weight value to a voice highlighting filter in a predetermined rendering unit section based on whether a voice is identified in each section of the first sound signal; and the second sound signal is rendered by applying a weight value to a sound effect highlighting filter in a predetermined rendering unit section based on whether a sound effect is identified in each section of the second sound signal.

In addition, in step S1140 of rendering, the first sound signal is rendered by updating a parameter applied in each of the predetermined rendering unit sections based on whether a voice is identified in each section of the first sound signal; and the second sound signal is rendered by updating a parameter applied in each of the predetermined rendering unit sections based on whether a sound effect is identified in each section of the second sound signal.

In addition, in step S1140 of rendering, a weight value of a filter applied to at least one of the first sound signal and the second sound signal is adjusted based on at least one of device setting information of the electronic device, viewing environment information, use history information, and additional information related to the sound content.

In addition, the control method may further include, in response to determining that a musical element exists in at least one of the first sound signal and the second sound signal, rendering at least one of the first sound signal and the second sound signal by applying a predetermined weight value to a music highlighting filter.

In addition, the sound signal may be a two-channel stereo signal, and, in step S1120 of providing, the two-channel stereo signal may be divided into a center signal which is a common component between the two-channel stereo signals and an ambient signal which is a differential component, and, in step S1140 of rendering, the center signal and the ambient signal may be individually rendered based on whether a voice is identified in the center signal and whether a sound effect is identified in the ambient signal.

According to various embodiments, a sound signal of a content is divided into a center signal and an ambient signal and the divided signals are rendered based on their respective signal characteristics, such that a voice can be provided more clearly and a wider sound field can be provided regarding a sound effect.

In addition, since sound rendering appropriate to each sound section of a content is performed by performing real-time rendering in the unit of a predetermined sound section, a smarter sound effect can be provided.

In addition, a sound of a content is rendered based on a variety of additional information, such that sound rendering optimized to a user context is performed and thus a smarter sound effect can be provided.

The methods according to the above-described various exemplary embodiments may be implemented simply by upgrading software or hardware of an existing electronic device.

In addition, the above-described various exemplary embodiments may be performed through an embedded server provided in the electronic device or an external server of the electronic device.

In addition, a non-transitory computer readable medium which stores a program performing the control method of the present disclosure in sequence may be provided.

For example, there may be provided a non-transitory computer readable medium which stores a program for performing: dividing a sound signal into a first sound signal which is a common component among a plurality of channels forming the sound signal, and a second sound signal which is a differential component among the plurality of channels; individually rendering the first sound signal and the second sound signal based on whether the first sound signal comprises a voice and whether the second sound signal comprises a sound effect; and mixing the first and second sound signals which are rendered into a multi-channel sound signal, and outputting the multi-channel sound signal.

The above-described various exemplary embodiments may be implemented in a recording medium readable by a computer or a similar device thereto by using software, hardware, or a combination thereof. In some situations, the embodiments described in the present disclosure may be implemented by a processor. According to software implementation, the embodiments such as procedures and functions described in the present disclosure may be implemented by separate software modules. Each of the software modules may perform one or more functions and operations described in the present disclosure.

Computer instructions for performing processing operations of the display apparatus 100 according to various embodiments may be stored in a non-transitory computer readable medium. The computer instructions stored in the non-transitory computer readable medium allow a specific device to perform processing operations in the display apparatus 100 according to the above-described various embodiments when the instructions are executed by a processor of the specific device.

The non-transitory computer readable medium refers to a medium that stores data semi-permanently rather than storing data for a very short time, such as a register, a cache, a memory or etc., and is readable by an apparatus. Examples of the non-transitory computer readable medium may include a compact disc (CD), a digital versatile disk (DVD), a hard disk, a Blu-ray disk, a universal serial bus (USB), a memory card, a ROM or etc.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An electronic device providing a smart sound mode, the electronic device comprising:
   a user command receiver;
   an inputter;
   an outputter; and
   a processor configured to:
   control the inputter to receive a sound signal of a plurality of channels;
   provide, in response to a predetermined event occurring, a user interface (UI) for guiding setting of a smart sound mode;
   in response to the smart sound mode being selected according to a user command input through the user command receiver, identify a frequency variation of a first sound signal and a second sound signal in each of a plurality of detection sections, wherein the first sound signal is a common component among the plurality of channels and the second sound signal is a differential component among the plurality of channels;
   render the first sound signal based on the identified frequency variation of the first sound signal in each of the plurality of detection sections of the first sound signal, render the second sound signal based on the identified frequency variation of the second sound signal in each of the plurality of detection sections of the second sound signal;
   mix the rendered first and second sound signals into a multi-channel sound signal; and
   control the outputter to output the multi-channel sound signal.

2. The electronic device of claim 1, wherein the processor is configured to:
   if a number of frequencies having a size variation greater than or equal to a first threshold is greater than or equal to a first threshold number in each section of the plurality of detection sections of the first sound signal, identify that a voice exists in a corresponding section; and
   if a number of frequencies having a size variation greater than or equal to a second threshold is greater than or equal to a second threshold number in each section of the plurality of detection sections of the second sound signal, identify that a sound effect exists in a corresponding section.

3. The electronic device of claim 1, wherein the processor is configured to:
   render the first sound signal by applying a weight value to a voice highlighting filter in each of a plurality of rendering sections of the first sound signal based on whether a voice exists in each section of the plurality of detection sections of the first sound signal; and
   render the second sound signal by applying a weight value to a sound effect highlighting filter in each of a plurality of rendering sections of the second sound signal based on whether a background sound exists in each section of the plurality of detection sections of the second sound signal.

4. The electronic device of claim 3, wherein the processor is configured to:
   render the first sound signal by updating a parameter applied in each of the plurality of rendering sections of the first sound signal based on whether each section of the plurality of detection sections of the first sound signal comprises a voice; and
   render the second sound signal by updating a parameter applied in each of the plurality of rendering sections of the second sound signal based on whether each section of the plurality of detection sections of the second sound signal comprises a sound effect.

5. The electronic device of claim 3, wherein the processor is configured to adjust a weight value of a filter applied to at least one of the first sound signal and the second sound signal based on at least one of device setting information of the electronic device, viewing environment information, use history information, and additional information related to the sound content.

6. The electronic device of claim 1, wherein, in response to determining that a musical element exists in at least one of the first sound signal and the second sound signal, the processor is configured to render the second sound signal by applying a predetermined weight value to a music highlighting filter.

7. The electronic device of claim 1, wherein the received sound signal is a two-channel stereo signal, and
wherein the processor is configured to divide the two-channel stereo signal into a center signal which is a common component in the two-channel stereo signal and an ambient signal which is a differential component in the two-channel stereo signal, and individually render the center signal and the ambient signal based on whether the center signal comprises a voice and whether the ambient signal comprises a sound effect.

8. The electronic device of claim 1, further comprising a display,
wherein, in response to the predetermined event occurring, the processor is configured to provide at least one of a UI for enabling entry to the smart sound mode and a UI for adjusting a smart sound effect through the display.

9. The electronic device of claim 8, wherein the predetermined event comprises at least one of an event of pressing a predetermined button provided on a remote control device controlling the electronic device, and an event of outputting a sound portion appropriate to apply the smart sound mode.

10. A control method of an electronic device providing a smart sound mode, the control method comprising:
receiving a sound signal of a plurality of channels;
providing, in response to a predetermined event occurring, a UI for guiding setting of a smart sound mode;
in response to the smart sound mode being selected according to a user command, identifying a frequency variation of a first sound signal and a second sound signal in each of a plurality of detection sections, wherein the first sound signal which is a common component among the plurality of channels and the second sound signal is a differential component among the plurality of channels;
rendering the first sound signal based on the identified frequency variation of the first sound signal in each of the plurality of detection sections of the first sound signal, rendering the second sound signal based on the identified frequency variation of the second sound signal in each of the plurality of detection sections of the second sound signal; and
mixing the rendered first and second sound signals into a multi-channel sound signal, and outputting the multi-channel sound signal.

11. The control method of claim 10, wherein the rendering comprises:
if a number of frequencies having a size variation greater than or equal to a first threshold is greater than or equal to a first threshold number in each section of the plurality of detection sections of the first sound signal, identifying that a voice exists in a corresponding section; and
if a number of frequencies having a size variation greater than or equal to a second threshold is greater than or equal to a second threshold number in each section of the plurality of detection sections of the second sound signal, identifying that a sound effect exists in a corresponding section.

12. The control method of claim 10, wherein the rendering comprises:
rendering the first sound signal by applying a weight value to a voice highlighting filter in each of a plurality of rendering sections of the first sound signal based on whether a voice exists in each section of the plurality of detection sections of the first sound signal; and
rendering the second sound signal by applying a weight value to a sound effect highlighting filter in each of a plurality of rendering sections of the second sound signal based on whether a sound effect exists in each section of the plurality of detection sections of the second sound signal.

13. The control method of claim 12, wherein the rendering comprises:
rendering the first sound signal by updating a parameter applied in each of the plurality of rendering sections of the first sound signal based on whether each section of the plurality of detection sections of the first sound signal comprises a voice; and
rendering the second sound signal by updating a parameter applied in each of the plurality of rendering sections of the second sound signal based on whether each section of the plurality of detection sections of the second sound signal comprises a sound effect.

14. The control method of claim 12, wherein the rendering comprises adjusting a weight value of a filter applied to at least one of the first sound signal and the second sound signal based on at least one of device setting information of the electronic device, viewing environment information, use history information, and additional information related to the sound content.

15. The control method of claim 10, further comprising, in response to determining that a musical element exists in at least one of the first sound signal and the second sound signal, rendering the second sound signal by applying a predetermined weight value to a music highlighting filter.

16. The control method of claim 10, wherein the received sound signal is a two-channel stereo signal,
wherein the rendering comprises:
dividing the two-channel stereo signal into a center signal which is a common component between the two-channel stereo signals and an ambient signal which is a differential component, and
individually rendering the center signal and the ambient signal based on whether the center signal comprises a voice and whether the ambient signal comprises a sound effect.

17. The control method of claim 10, further comprising, in response to the predetermined event occurring, providing at least one of a UI for enabling entry to the smart sound mode and a UI for adjusting a smart sound effect.

18. A non-transitory computer readable medium which stores computer instructions for allowing an electronic device to perform an operation when the instructions are executed by a processor of the electronic device, the operation comprises:
receiving a sound signal of a plurality of channels:
providing, in response to a predetermined event occurring, providing a UI for guiding setting of a smart sound mode;
in response to the smart sound mode being selected according to a user command, identifying a frequency variation of a first sound signal and a second sound signal in each of a plurality of detection sections, wherein the first sound signal is a common component among the plurality of channels and the second sound signal which is a differential component among the plurality of channels;

rendering the first sound signal based on the identified frequency variation of the first sound signal in each of the plurality of detection sections of the first sound signal, rendering the second sound signal based on the identified frequency variation of the second sound signal in each of the plurality of detection sections of the second sound signal; and mixing the rendered first and second sound signals into a multi-channel sound signal, and outputting the multi-channel sound signal.

\* \* \* \* \*